(12) United States Patent
Ogawa

(10) Patent No.: US 6,714,927 B1
(45) Date of Patent: Mar. 30, 2004

(54) APPARATUS FOR RETRIEVING DOCUMENTS

(75) Inventor: Yasushi Ogawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 471 days.

(21) Appl. No.: 09/639,108

(22) Filed: Aug. 16, 2000

(30) Foreign Application Priority Data

Aug. 17, 1999 (JP) ............................................ 11-230749

(51) Int. Cl.[7] .............................................. G06F 17/30
(52) U.S. Cl. ................................ 707/3; 707/2; 707/102; 704/7
(58) Field of Search ....................... 707/1–10, 100–102; 704/9–10, 7

(56) References Cited

U.S. PATENT DOCUMENTS 5,412,807 A * 5/1995 Moreland ........................ 707/3
5,706,365 A * 1/1998 Rangarajan et al. ........ 707/102

FOREIGN PATENT DOCUMENTS

| JP | 6-052222 | 2/1994 |
| JP | 8-101848 | 4/1996 |
| JP | 11-282880 | 10/1999 |

OTHER PUBLICATIONS

D'Amore et al. (One–time complete indexing of text: theory and practice, ACM, 1985, pp. 155–164).*
Yasushi et al. (Optimizing query evaluation in n–gram indexing, ACM, Aug. 1998, pp. 367–368).*
Yasushi et al. ("Overlapping statistical word indexing: A new indexing method for Japanese text", ACM, 1997, pp. 225–234).*

* cited by examiner

Primary Examiner—Kim Vu
Assistant Examiner—Joon Hwan Hwang
(74) Attorney, Agent, or Firm—Oblon, Spivak, McClelland, Maier & Neustadt, P.C.

(57) ABSTRACT

In an apparatus for retrieving documents, each document and a query character string are divided into a plurality of index keys. A retrieval condition analyzing part analyses a retrieval condition including the index keys divided from the query character string and generates a retrieval condition tree synthesized by at least one operator that retrieves an intermediate retrieval result including the document information from said index table. A retrieval condition evaluating part evaluates each intermediate retrieval result obtained by the retrieval condition tree and determining a final retrieval result.

39 Claims, 19 Drawing Sheets

| INDEX KEYS | INDEX INFORMATION LIST ||
|---|---|---|
| | NUMBER OF DOCUMENTS | APPEARANCE INFORMATION PER DOCUMENT |
| A | 1 | {1, 1, (3)} |
| A A | 1 | {1, 2, (1, 2)} |
| A I | 2 | {2, 1, (1)} , {3, 1, (1)} |
| I U | 2 | {2, 1, (2)} , {4, 1, (1)} |
| I E | 1 | {3, 1, (2)} |
| U | 1 | {4, 1, (2)} |
| U E | 1 | {2, 1, (3)} |
| E | 1 | {3, 1, (3)} |
| E O | 1 | {2, 1, (4)} |
| O | 1 | {2, 1, (5)} |

F I G. 6

| INDEX KEYS | INDEX INFORMATION LIST | |
|---|---|---|
| | NUMBER OF DOCUMENTS | APPEARANCE INFORMATION PER DOCUMENT |
| A | 3 | {1, 3, (1, 2, 3)} , {2, 1, (1)} , {3, 1, (1)} |
| A A | 1 | {1, 2, (1, 2)} |
| A I | 2 | {2, 1, (1)} , {3, 1, (1)} |
| I | 3 | {2, 1, (2)} , {3, 1, (2)} , {4, 1, (1)} |
| I U | 2 | {2, 1, (2)} , {4, 1, (1)} |
| I E | 1 | {3, 1, (2)} |
| U | 2 | {2, 1, (3)} , {4, 1, (2)} |
| U E | 1 | {2, 1, (3)} |
| E | 2 | {2, 1, (4)} , {3, 1, (3)} |
| E O | 1 | {2, 1, (4)} |
| O | 1 | {2, 1, (5)} |

F I G. 8
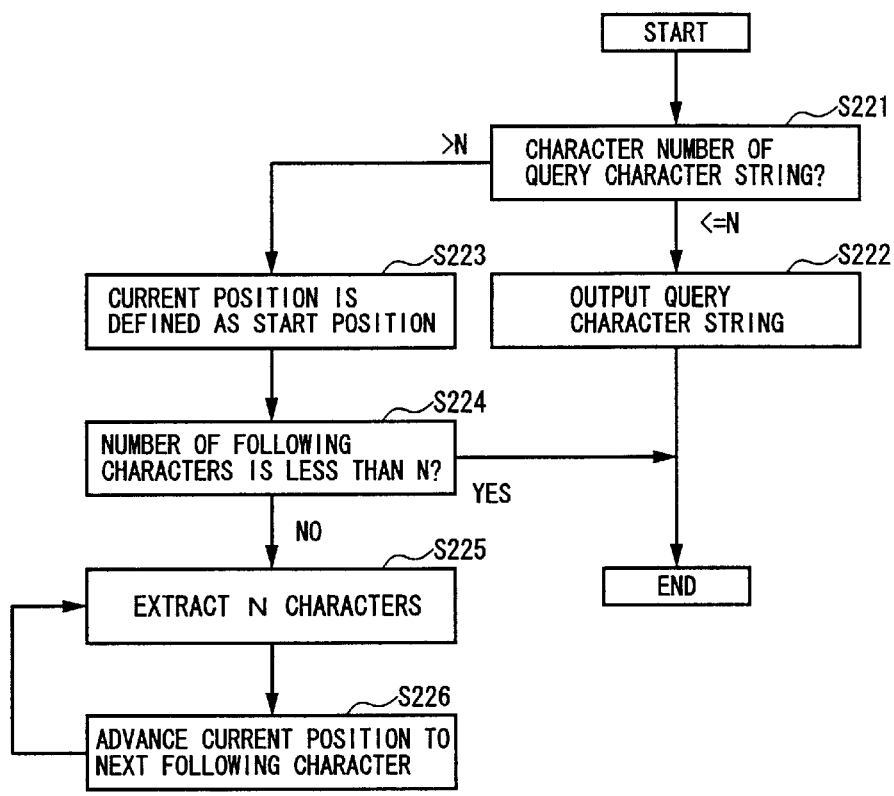

FIG. 16

INDEX INFORMATION LIST

| INDEX KEYS | NUMBER OF DOCUMENTS | APPEARANCE INFORMATION PER DOCUMENT |
|---|---|---|
| A | 1 | {1, 1, (5)} | 
| A I | 5 | {1, 1, (1)}, {2, 1, (1)}, {3, 1, (1)}, {4, 1, (1)}, {5, 1, (1)} |
| I | 1 | {2, 1, (5)} |
| I U | 5 | {1, 1, (2)}, {2, 1, (2)}, {3, 1, (2)}, {4, 1, (2)}, {5, 1, (2)} |
| U | 1 | {3, 1, (5)} |
| U E | 5 | {1, 1, (3)}, {2, 1, (3)}, {3, 1, (3)}, {4, 1, (3)}, {5, 1, (3)} |
| E | 1 | {4, 1, (5)} |
| E A | 1 | {1, 1, (4)} |
| E I | 1 | {2, 1, (4)} |
| E U | 1 | {3, 1, (4)} |
| E E | 1 | {4, 1, (4)} |
| E O | 1 | {5, 1, (4)} |
| O | 1 | {5, 1, (5)} |

APPARATUS FOR RETRIEVING DOCUMENTS

BACKGROUND OF THE INVENTION

1. Field of the Invention

The present invention generally relates to a document retrieval apparatus for retrieving documents including a query character string by using index keys registered for a plurality of registered documents.

2. Description of the Related Art

Conventionally, a full text search has been used as a method for document retrieval. However, in the full text search, since it is needed to search all registered documents, there is a problem in that a huge amount of retrieval time is required to search for a large amount of documents. To eliminate this problem, an index structure and a document retrieval processing method have been improved to realize a high-speed retrieval. As an index structure, a method for corresponding an index key to a document ID was mainly implemented. In this method, presence of an index key relating to registered documents can be obtained. However, in general, a query character string is divided into a plurality of index keys and each index key is collated with character strings in all registered documents. Hence, a search noise (over searched data) is caused. A process for eliminating the search noise is required, while there is a limitation to improve a high-speed retrieval. In order to further improve the high-speed retrieval, another method is recently proposed in that an appearance location of the index key in each document is additionally included in an index table.

For example, in the Japanese Patent Laid-open Application No. 6-52222, a character string appearing at a predetermined frequency in registered documents is stored in the index table with an appearance location in the registered documents. The documents including a query character string are specified by using the appearance locations of index keys relating to the query character string.

Further, in the Japanese Patent Laid-open Application No. 8-101848, information including each single character and the appearance location thereof in the registered documents is compressed and then registered in the index table. The documents including a query character string are specified by using the appearance locations of index keys relating to the query character string.

However, there are disadvantages in the above methods in that a retrieval time is increased when the length of an index key is shorter, a query character string including short index keys is not properly searched for in a case where longer index keys are defined, and the retrieval time is increased when a query character string is longer.

SUMMARY OF THE INVENTION

It is a general object of the present invention to provide a document retrieval apparatus for retrieving documents in which the above-mentioned problems are eliminated.

A more specific object of the present invention is to provide a document retrieval apparatus for retrieving documents which improves a document dividing process and a retrieval condition evaluating process so as to effectively retrieve documents.

The above objects of the present invention are achieved by an apparatus for retrieving documents including: a document dividing part dividing each document into partial character strings as index keys; an index table maintaining the index keys and document information relating to each index key; a query character string dividing part dividing a query character string into a plurality of index keys; a retrieval condition analyzing part analyzing a retrieval condition including the index keys divided from the query character string and generating a retrieval condition tree where the index keys are synthesized by at least one operator that retrieves an intermediate retrieval result including the document information from said index table; a retrieval condition evaluating part evaluating each intermediate retrieval result obtained by the retrieval condition tree and determining a final retrieval result.

According to the present invention, it is possible to reduce the size of a document set that may be searched for by an operation. Therefore, the document retrieval process can be effectively conducted.

The above objects of the present invention are achieved by a method for retrieving documents including the steps of: (a) dividing each document into partial character strings as index keys; (b) maintaining the index keys and document information relating to each index key; (c) dividing a query character string into a plurality of index keys; (d) analyzing a retrieval condition including the index keys divided from the query character string and generating a retrieval condition tree where the index keys are synthesized by at least one operator that retrieves an intermediate retrieval result including the document information from said index table; (e) evaluating each intermediate retrieval result obtained by the retrieval condition tree and determining a final retrieval result.

According to the present invention, the method can reduce the size of a document set that may be searched for by an operation. Therefore, the document retrieval process can be effectively conducted.

The above objects of the present invention are achieved by a computer-readable recording medium having program code recorded therein for causing a computer to retrieve documents, said program code comprising the code for: (a) dividing each document into partial character strings as index keys; (b) maintaining the index keys and document information relating to each index key; (c) dividing a query character string into a plurality of index keys; (d) analyzing a retrieval condition including the index keys divided from the query character string and generating a retrieval condition tree where the index keys are synthesized by at least one operator that retrieves an intermediate retrieval result including the document information from said index table; (e) evaluating each intermediate retrieval result obtained by the retrieval condition tree and determining a final retrieval result.

According to the present invention, computer-readable recording medium can be provided in which the size of a document set, which may be searched for by an operation, can be reduced. Therefore, the document retrieval process can be effectively conducted.

BRIEF DESCRIPTION OF THE DRAWINGS

Other objects, features and advantages of the present invention will become more apparent from the following detailed description when read in conjunction with the accompanying drawings, in which:

FIG. 6 is a diagram showing an index table according to a second embodiment of the present invention;

FIG. 8 is a flowchart showing a process executed by the query character string dividing unit according to the second embodiment of the present invention;

FIG. 16 is a diagram showing an index table according to a second embodiment of the present invention;

DESCRIPTION OF THE PREFERRED EMBODIMENTS

In the following, embodiments of the present invention will be described with reference to the accompanying drawings.

Figure 1:
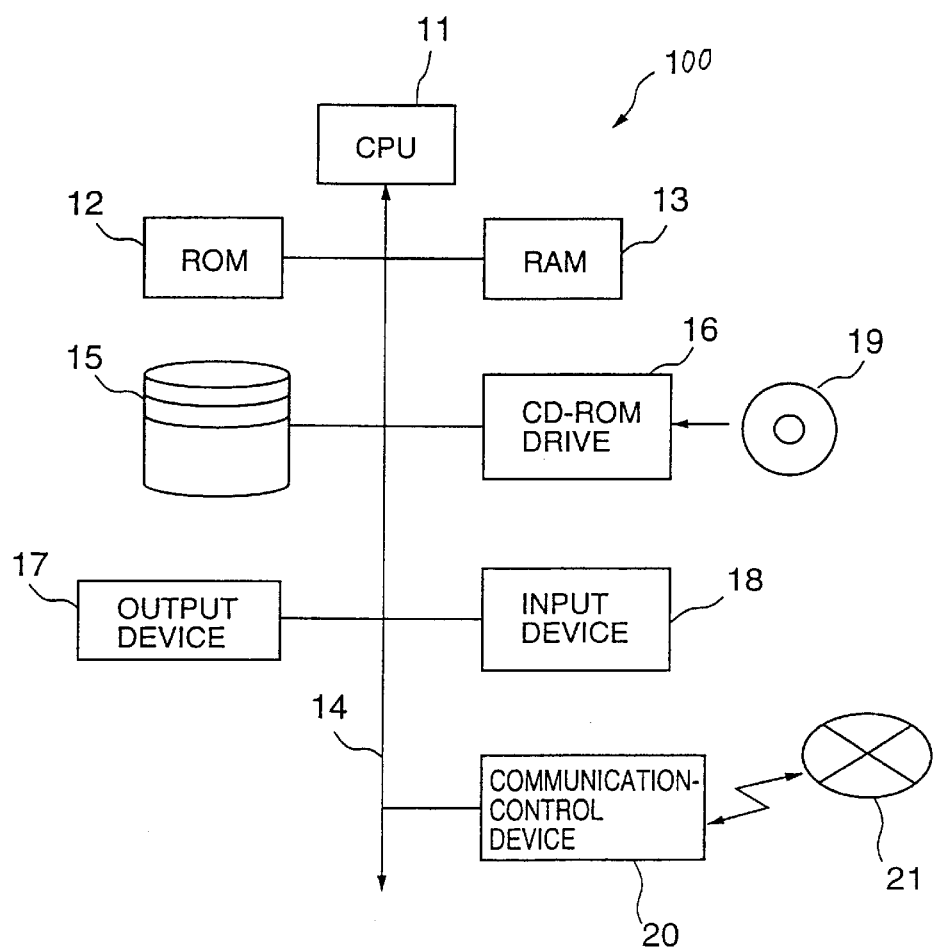
FIG. 1 is a block diagram of an apparatus configuration that implements a document retrieval apparatus according to a first embodiment of the present invention.

FIG. 1 is a block diagram of an apparatus configuration that implements a document retrieval apparatus according to a first embodiment of the present invention.

The document retrieval apparatus 100 includes a CPU 11, a ROM 12, a RAM 13, a bus 14, a hard drive 15, a CD-ROM drive 16, an output device 17, an input device 18, and a communication-control device 20. The CPU 11 attends to various executions and central control of various elements. The ROM 12 is a read-only memory storing therein BIOS programs and the like. The RAM 13 stores therein data, and provides a work area for the CPU 11. The bus 14 connects between the CPU 11, the ROM 12, and the RAM 13. The bus 14 is also connected via interfaces and/or control circuits (not shown) to the hard drive 15, the CD-ROM drive 16, the output device 17 such as a CRT display, a LCD display, or a printer, the input device 18 such as a keyboard and a mouse, and the communication-control device 20, which is connected to a network 21.

Programs for causing the document retrieval apparatus 100 to perform processing according to the present invention are recorded in a CD-ROM 19 serving as a memory medium of the present invention. The CD-ROM 19 is inserted into the CD-ROM drive 16, and the programs are loaded and installed in the hard drive 15. With the programs stored in the hard drive 15, the document retrieval apparatus 100 is ready to execute various processes of the present invention.

The memory medium of the present invention is not limited to a CD-ROM, but may be any types of memory media such as CD-RW, CD-R, DVD, FD, or MO. The program may be downloaded from the network 19 such as the Internet via the communication-control device 20, and may be installed in the hard drive 15. In this case, a memory device that stores therein the programs on the transmission side of the network 19 is regarded as the memory medium of the present invention. The programs may operate on a predetermined operation apparatus.

Figures 2, 3:
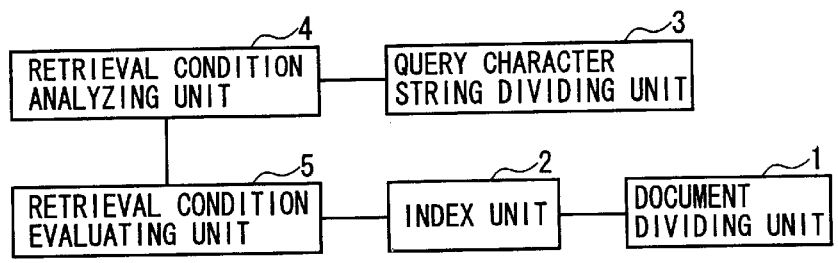
FIG. 2 is a schematic block diagram showing a document retrieval apparatus according to a first embodiment of the present invention.
FIG. 3 is a diagram showing an index table according to the first embodiment of the present invention.

FIG. 2 is a schematic block diagram showing a document retrieval apparatus according to a first embodiment of the present invention. The document retrieval apparatus 100 includes a document dividing unit 1, an index unit 2, a query character string dividing unit 3, a retrieval condition analyzing unit 4, and a retrieval condition evaluating unit 5. The document dividing unit 1 divides a text of a registered document into partial character strings (as index keys listed in an index table) The index unit 2 maintains a number of documents including each index key, a document ID of a document including the index key, a frequency of appearances of each index key per document, a list of appearance locations of each index key per document. The query character string dividing unit 3 divides a query character string determined as a retrieval condition into a plurality of index keys listed in the index table. The retrieval condition analyzing unit 4 analyzes a retrieval condition. Also, the retrieval condition analyzing unit 4 generates an empty document set indicating there is not documents when the index unit 2 or the query character string dividing unit 3 does not output any index key from a query character string, or, generates a retrieval condition tree showing synthesized index keys by set operators. The retrieval condition evaluating unit 5 selects information relating to an index key from the index table based on the retrieval condition tree and obtains a retrieval result by executing a retrieval result synthesizing process.

In the present invention, a registration process stores information necessary for a high-speed search, which of a document group may be searched for. A method and a device for document retrieval is disclosed in the Japanese Patent Laid-open Application No. 10-256974 filed by the same applicant as the present invention. In an apparatus as claimed in claim 2 in the above Japanese Patent Laid-open Application, when the length of a query character string is less than n characters, the last part of the registered document can not be properly retrieved. On the contrary, in the first embodiment of the present invention, the document dividing unit 1 divides registered documents into index keys. Each index key has the length of n characters (hereinafter called a n-character string) where an integer n is a number equal to or more than '1'. When a n>1, in addition to index keys of n-character strings, index keys of n'-character string including a last character of the registered documents are obtained as a division result, where n' is an integer less than the integer n. It is assumed that a document 1="AAA", a document 2="AIUEO", a document 3="AIE" and a document 4="IU" are registered where each alphabet represents each Japanese character. When n=2, an index information list showing information relating to each index key is recorded as shown in FIG. 3. It should be noted that information in parenthesis { and } denotes appearance information per document and a first field denotes a document ID, a second field denotes frequency of an index key in a document, a third field with parenthesis ( and ) denotes an appearance location.

In the first embodiment of the present invention, index keys of single characters ("A", "I", "U", "E", "O") are registered, in a different view point from the apparatus as claimed in claim 2 in the above prior application. When n=3, for example, in addition to character strings "AIU", "IUE" and "UEO" from the document 2, "EO" and "O" are extracted as index keys where "EO" and "O" are character strings less than three characters in length and including a last character "O".

When a query character string is equal to or more than n+1 characters in length, the query character string dividing unit 3 divides the query character string into index keys of n-character strings. The retrieval condition analyzing unit 4 synthesizes a distance between appearance locations of the index keys by location operations. It is assumed that #distance[x](A,B) indicates to search for documents including character strings that include an index key A and an index key B being x characters in distance. For example, in a case of n=2, when a query character string is "AIU", the query character string dividing unit 3 divides the query character string "AIU" into two index keys "AI" and "IU". The retrieval condition analyzing unit 4 generates a retrieval condition tree corresponding to #distance[1](AI,IU). The retrieval condition analyzing unit 4 obtains the appearance information relating to the index keys "AI" and "IU" from the index table and searches for the appearance information showing a distance 1 of index keys "AI" or "IU". As a result, only the document 2 is retrieved.

In a case in which a query character string is n characters in length, the query character string dividing unit 3 defines the query character string itself as an index key and the retrieval condition analyzing unit 4 generates a retrieval condition based on the index key defined by the query character string dividing unit 3. For example, when n=2 and a query character string is the index key "IE", the query character string dividing unit 3 extracts an index key "IE" from the query character string and the retrieval condition analyzing unit 4 generates a retrieval condition tree corresponding to "IE". As a result, the document 3 is retrieved.

In a case in which n>1 and the query character string is less than n characters in length, the query character string dividing unit 3 outputs index keys where a first part of the index keys identically corresponds to that of the query character string from the beginning character and the retrieval condition analyzing unit 4 synthesizes these index keys by an OR set operator forming an OR set of a plurality of retrieval results. For example, when the query character string is "E", the query character string dividing unit 3 outputs index keys "E" and "EO" and the retrieval condition analyzing unit 4 generates a retrieval condition tree #or(E, EO). It should be noted that #or(A,B) indicates to retrieve an OR set of a document set including an index key A and a document set including an index key B. As a result, the document 2 and the document 3 are retrieved. On the contrary, in the apparatus as claimed in claim 2 in the prior application, the document 2 alone is retrieved but the document 3 can not be retrieved.

Figure 4:
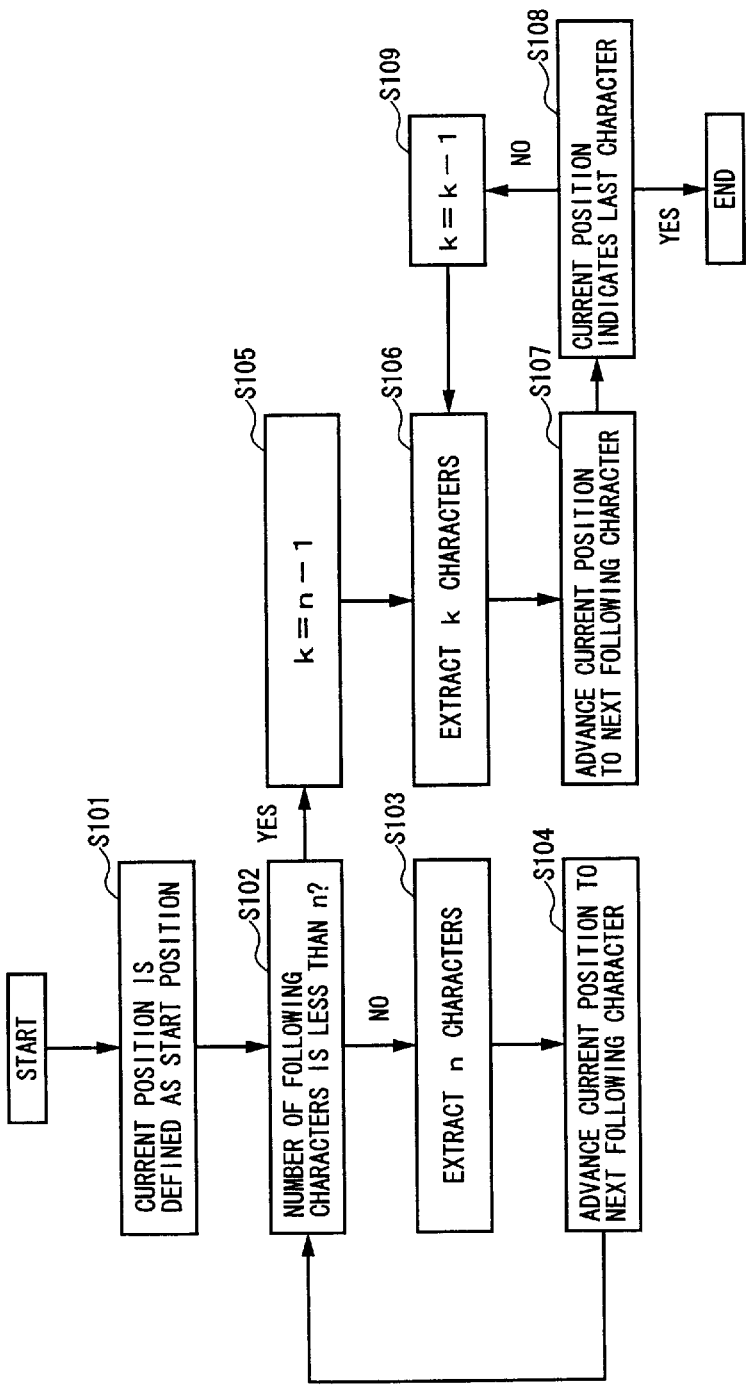
FIG. 4 is a flowchart showing a process executed by the document dividing unit according to a first embodiment of the present invention.

FIG. 4 is a flowchart showing a process executed by the document dividing unit according to the first embodiment of the present invention.

In a step S101 of FIG. 4, a current position is defined as a start position.

In a step S102, a check is made as to whether the number of the following characters from the current position is less than n. If the number of the following characters is not less than n, n characters are extracted from the following characters in a step S103 and then the current position is advanced to a next following character in a step S104. The process goes back to the step S102.

On the other hand, if the number of the following characters is less than n, k is set to n−1 in a step S105 and then k characters are extracted from the following characters in a step S106. Subsequently, the current position is advanced to a next following character in a step S107.

In a step S108, a check is made as to whether the current position indicates the last character. If the current position does not indicate the last character, k is decreased by 1 (k=k−1) in a step S109. On the other hand, if the current position indicates the last character, the process is terminated.

Figure 5:
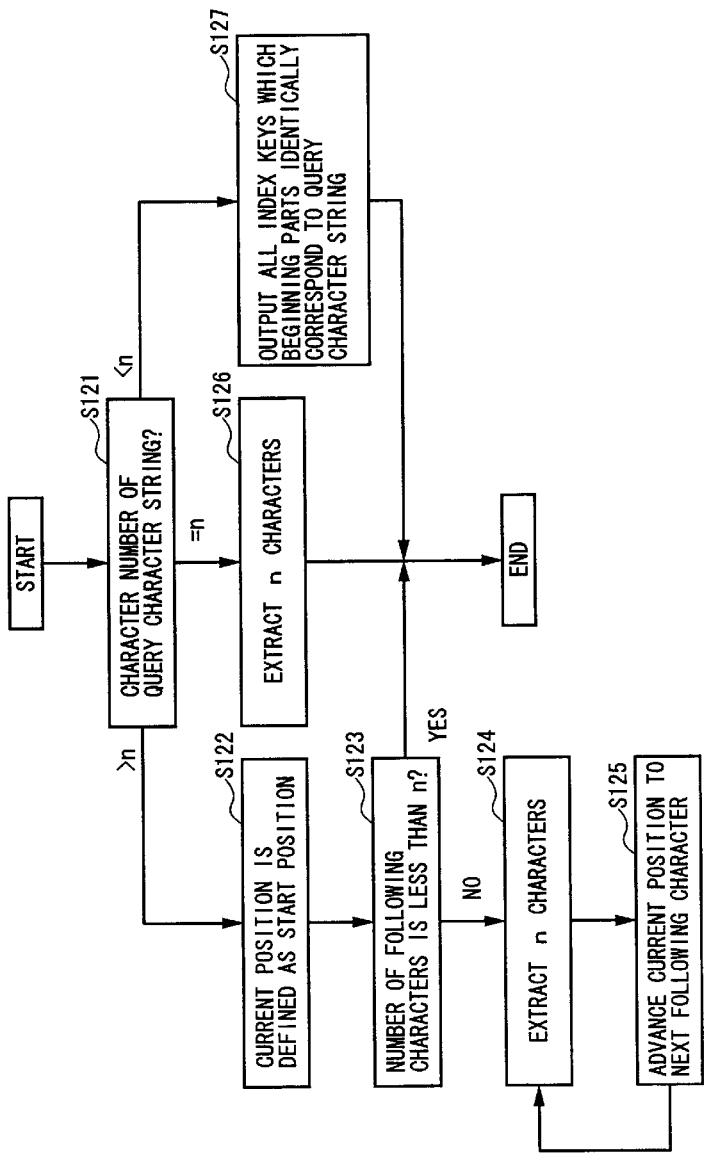
FIG. 5 is a flowchart showing a process executed by the query character string dividing unit according to the first embodiment of the present invention.

FIG. 5 is a flowchart showing the process is executed by the query character string dividing unit according to the first embodiment of the present invention.

In a step S121, the number of characters of a query character string is checked. If the number of the query character string is greater than n (>n), a current position is determined as a start position in a step S122.

In a step S123, a check is made as to whether the number of following characters is less than n. If the number of following characters is less than n, the process is terminated. On the other hand, if the number of following characters is not less than n, n characters are extracted the following characters in a step S124 and then the current position is advanced to a next following character in a step S125. The process goes back to the step S123.

If the number of the query character string is equal to n (=n), n characters are extracted from the query character string in a step S126 and then the process is terminated.

If the number of the query character string is less than n (<n), all index keys having the same character as the query character string at the start position are output in a step S127 and then the process is terminated.

In the first embodiment of the present invention, when n>1, a query character string formed by a single character is searched for and the search ends up to an OR set operation result of a plurality of index keys. Hence, the retrieval time is slow when a search is conducted by the query character string formed by a single character. In order to eliminate this problem, index keys being equal to or more than one characters and equal to or less than N characters are extracted from the registered documents and then an index table is generated.

FIG. 6 is a table showing an index table according to a second embodiment of the present invention.

When N=2 for four documents used in the first embodiment, an index table generated in the above method is shown in FIG. 6. Differently from the table in FIG. 3, in addition to the last character of each registered document, appearances of other single characters are recorded in FIG. 6. 'In the retrieval document apparatus 100 according to the second embodiment, when a query character string is equal to or more than N+1 characters in length, the same process as the first embodiment is executed. When 1≦length of query character string≦N, the query character string dividing unit 3 defines the query character string as an index key and the retrieval condition analyzing unit 4 generates a retrieval condition including the index key. When the query character string is "E", the query character string dividing unit 3 outputs a single character "E" as an index key and the retrieval condition analyzing unit 4 generates a retrieval condition tree "E". In the second embodiment, the document 2 and the document 3 are retrieved without conducting the OR set operation as shown in the first embodiment.

Figure 7:
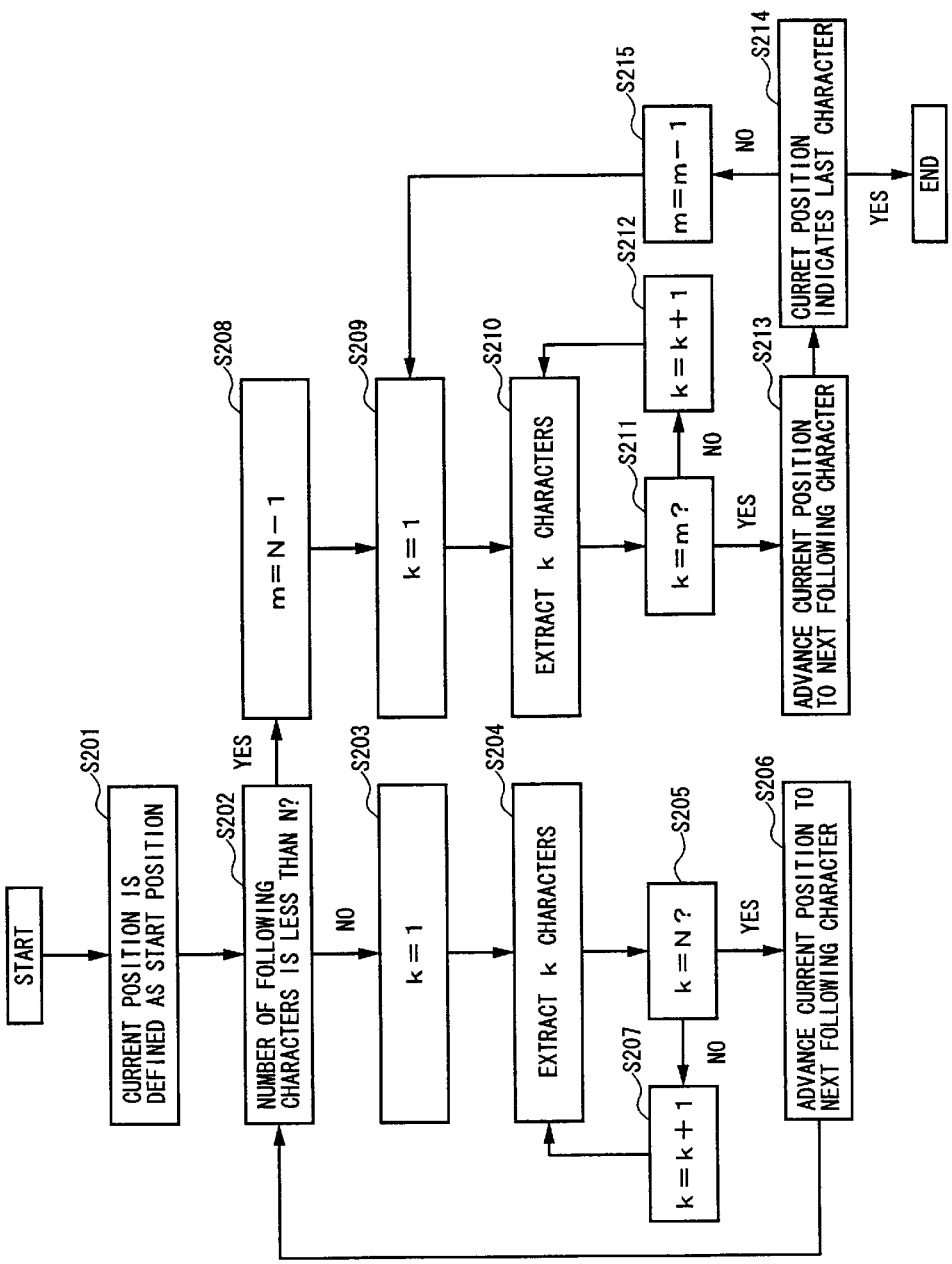
FIG. 7 is a flowchart showing a process executed by the document dividing unit according to a second embodiment of the present invention.

FIG. 7 is a flowchart showing a process executed by the document dividing unit according to the second embodiment of the present invention;

In a step S201 of FIG. 7, a current position is defined as a start position.

In a step S202, a check is made as to whether the number of the following characters from the current position is less than N. If the number of the following characters is not less than n, k is set to "1" in a step S203 and then n characters are extracted from the following characters in a step S204.

In a step S205, a check is made as to whether k is equal to N (k=N). If k is not equal to N, k is incremented by 1 (k=k+1) in a step S207 and then the process goes back to the step S204.

On the other hand, if k is equal to N, the current position is advanced to a next following character in a step S206. The process goes back to the step S202.

On the other hand, if the number of the following characters is less than N, m is set to N−1 (m=N−1) in a step S208 and k is set to 1 (k=1) in a step S209.

In a step S210, k characters are extracted from the following characters.

In a step S211, a check is made as to whether k is equal to m (k=m) If k is not equal to m, k is incremented by 1 (k=k+1) in a step S212 and then the process goes back to the step S210.

On the other hand, if k is not equal to m, the current position is advanced to a next following character in a step S213 and the process goes to a step S214.

In the step S214, a check is made as to whether the current position indicates the last character. If the current position does not indicate the last character, m is decreased by 1 (m=m−1) in a step S215 and then the process goes back to the step S209. On the other hand, if the current position indicates the last character, the process is terminated.

FIG. 8 is a flowchart showing a process executed by the query character string dividing unit according to the first embodiment of the present invention.

In a step S221, the number of characters of a query character string is checked. If the number of a query character string is greater than N (>N), a current position is determined as a start position in a step S223.

In a step S224, a check is made as to whether the number of following characters is less than N. If the number of following characters is less than N, the process is terminated. On the other hand, if the number of following characters is not less than N, N characters are extracted the following characters in a step S225 and then the current position is advanced to a next following character in a step S226.

If the number of a query character string is equal to or greater than N (≦N) the query character string is output in a step S222 and then the process is terminated.

In the document retrieval apparatus 100 in the second embodiment, the search by a query character string formed by a single character is processed at high speed. However, this results in increase of the number of index keys. That is, it is not preferable to define division length of the registered documents as or more one characters.

Accordingly, in a third embodiment of the present invention, when n is defined as an integer equal to or more than two characters, each index key having different length equal to or more than n characters and equal to or less than N characters is extracted from the registered documents so as to generate an index table. The document retrieval may be processed in any one of three cases as described in the first embodiment. Thereafter, the document retrieval process is explained where n=2 and N−3. When a query character string is "AIUEO", the query character string is equal to or more than N characters in length. Thus, a retrieval condition tree #distance[1](AIU,IUE) is generated. When a query character string is "AIU", the query character string is equal to or more than n characters and equal to or less than N characters in length. Thus, a retrieval condition tree #distance[1](AIU) is generated. In the same method, when a query character string is "AI", a retrieval condition tree "AI" is obtained. When a query character string is "A", a retrieval condition tree #or(A, AA, AAA, . . . , AI, AIA, . . . , AN, . . . , ANN) is obtained since the query character string "A" is less than n characters in length. In this case, it is assumed that only alphabet is included in each document.

Figure 9:
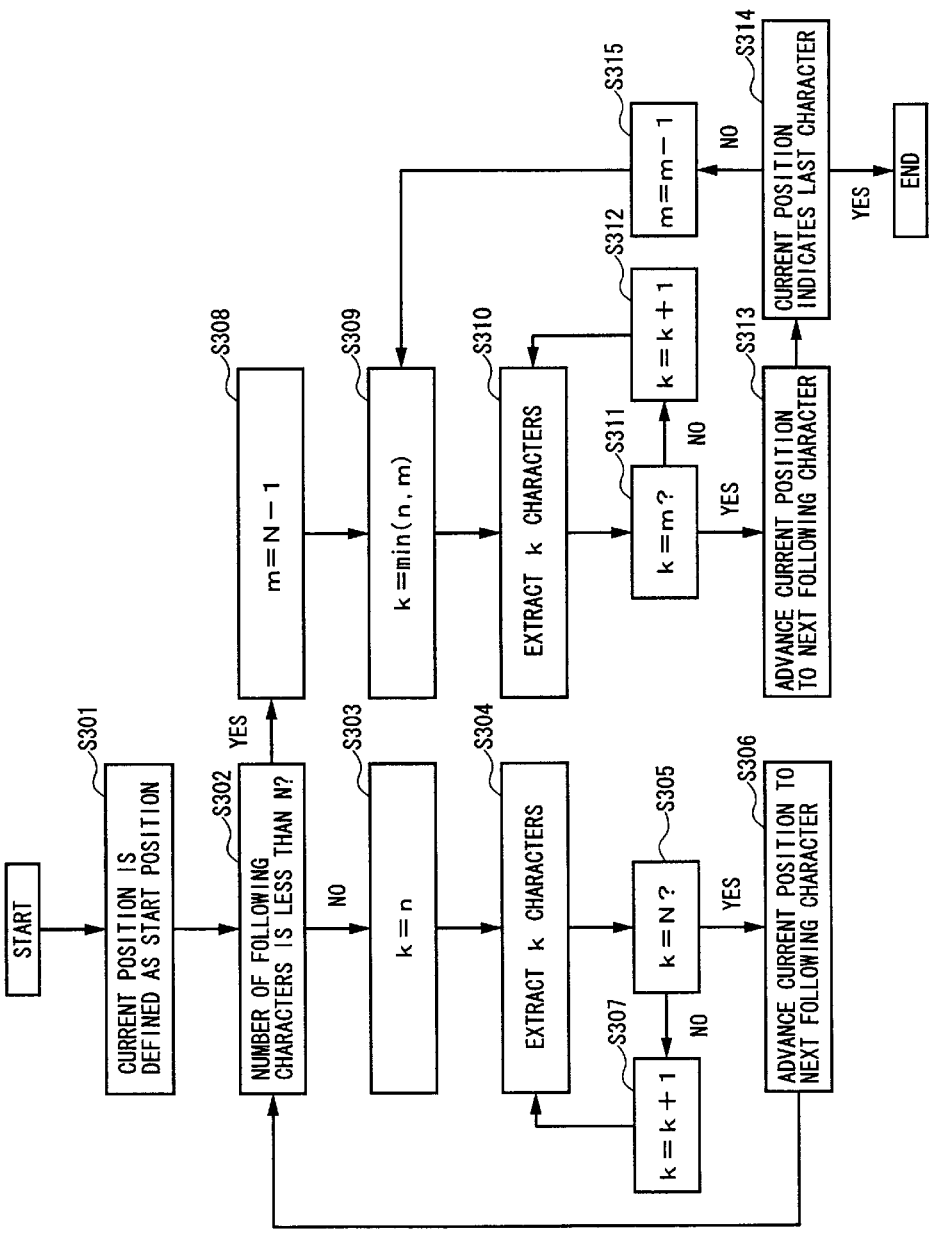
FIG. 9 is a flowchart showing a process executed by the document dividing unit according to a third embodiment of the present invention.

FIG. 9 is a flowchart showing a process executed by the document dividing unit according to a third embodiment of the present invention.

In a step S301 of FIG. 9, a current position is defined as a start position.

In a step S302, a check is made as to whether the number of the following characters from the current position is less than n. If the number of the following characters is not less than N, k is set to n in a step S303 and then n characters are extracted from the following characters in a step S304.

In a step S305, a check is made as to whether k is equal to N (k=N) If k is not equal to N, k is incremented by 1 (k=k+1) in a step S307 and then the process goes back to the step S304.

On the other hand, if k is equal to N, the current position is advanced to a next following character in a step S306. The process goes back to the step S302.

On the other hand, if the number of the following characters is less than N, m is set to N−1 (m=N−1) in a step S308 and k is set to a minimum value of n and m (k=min(n,m)) in a step S309.

In a step S310, k characters are extracted from the following characters.

In a step S311, a check is made as to whether k is equal to m (k=m). If k is not equal to m, k is incremented by 1 (k=k+1) in a step S312 and then the process goes back to the step S310.

On the other hand, if k is not equal to m, the current position is advanced to a next following character in a step S313 and the process goes to a step S314.

In the step S314, a check is made as to whether the current position indicates the last character. If the current position does not indicate the last character, m is decreased by 1 (m=m−1) in a step S315 and then the process goes back to the step S309. On the other hand, if the current position indicates the last character, the process is terminated.

Figure 10:
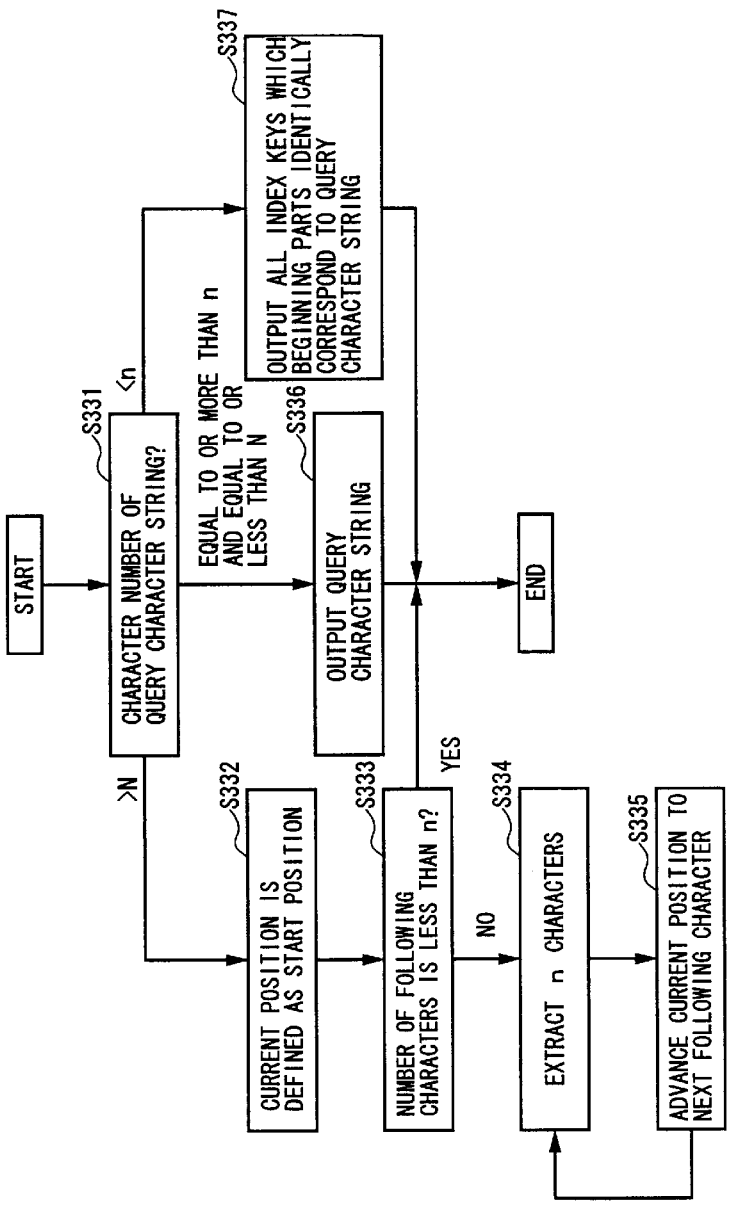
FIG. 10 is a flowchart showing a process executed by the query character string dividing unit according to the third embodiment of the present invention.

FIG. 10 is a flowchart showing a process executed by the query character string dividing unit according to the third embodiment of the present invention.

In a step S331 of FIG. 10, the number of characters of a query character string is checked. If the number of a query character string is greater than N (>N), a current position is determined as a start position in a step S332.

In a step S333, a check is made as to whether the number of following characters is less than n. If the number of following characters is less than n, the process is terminated. On the other hand, if the number of following characters is not less than n, n characters are extracted the following characters in a step S334 and then the current position is advanced to a next following character in a step S335.

If the number of the query character string is equal to or greater than n (n≦) and equal to or less than N (≦N), the query character string is output in a step S336 and then the process is terminated.

If the number of the query character string is less than n (<n), all index keys, which beginning parts identically correspond to the query character string, are output in a step S337 and then the process is terminated.

In the document retrieval apparatus 100 according to the third embodiment, when a query character string being less than n characters is processed, the query character string dividing unit 3 outputs all index keys which beginning parts identically correspond to the query character string. This results in increase of the number of index keys that may be synthesized by the OR set operator.

Accordingly, in a document retrieval apparatus 100 according to a fourth embodiment, the query character string dividing unit 3 outputs index keys where a first part of each index key identically corresponds to that of a query character string from the beginning character, from the index information list. When the index keys are registered, every n-character string included in the registered documents is always registered. Thus, when a search is executed, index keys less than n characters in length are synthesized by the OR set operator so that the above problem is eliminated. As described above, only index keys less than n characters are output. Therefore, it is possible to reduce the number of index keys that may be synthesized by the OR set operator and the search can be executed at high speed. For example, when a query character string is "A" where n=2 and N=3, a retrieval condition tree #OR(A, AA, AI, . . . , AN) is obtained.

Figure 11:
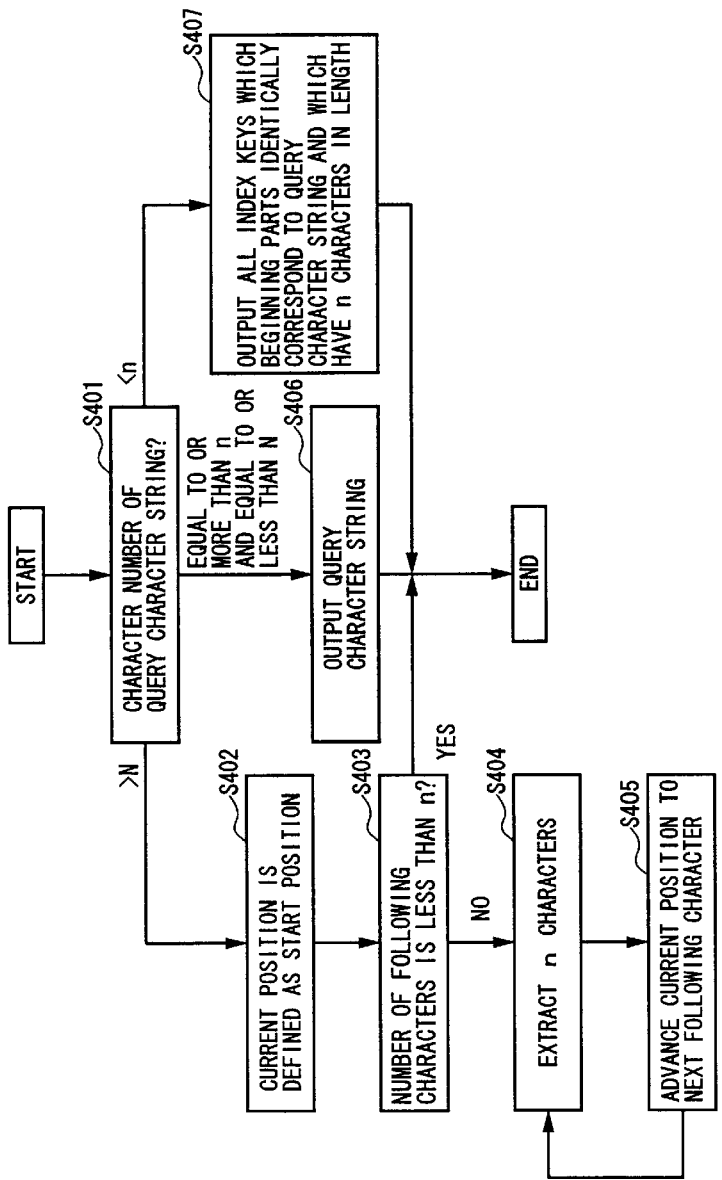
FIG. 11 is a flowchart showing a process executed by the query character string dividing unit according to a fourth embodiment of the present invention.

FIG. 11 is a flowchart showing a process executed by the query character string dividing unit according to the fourth embodiment of the present invention.

In a step S401 of FIG. 11, the number of characters of a query character string is checked. If the number of a query character string is greater than N (>N), a current position is determined as a start position in a step S402.

In a step S403, a check is made as to whether the number of following characters is less than n. If the number of following characters is less than n, the process is terminated. On the other hand, if the number of following characters is not less than n, n characters are extracted the following characters in a step S404 and then the current position is advanced to a next following character in a step S405. The process goes back to the step S403.

If the number of the query character string is equal to or greater than n (n≦) and equal to or less than N (≦N), the query character string is output in a step S406 and then the process is terminated.

If the number of the query character string is less than n (<n), all index keys are output where beginning parts of the index keys identically correspond to the query character string and the index keys have n characters in length in a step S407 and then the process is terminated.

In Japanese language, there are a plurality of character types such as Katakana, Hiragana, Kanji and the like. There are features as follows:
 a word is generally formed by only one character type.
 the length of a word in the same meaning may be different in each character type.

Accordingly, it is not effective to divide the registered document and a query character string without considering the features of the character types.

In a document retrieval apparatus 100 according to a fifth embodiment, effective registration and document retrieval processes can be realized by considering the features of the character types. That is, a method according to one of the processes described in the first, the second and the third embodiments is selected based on the character type. For example, when a division method in the first embodiment is applied to one of character types, n is selectively defined for the character type. When a division method in the second embodiment is applied to one of character types, N is selectively defined for the character type. When a division method in the third embodiment is applied to one of the character types, n and N are selectively defined for the character types.

It is assumed that there are three character types of Katakana, Kanji and another character type. In this case, for example, index keys are generated as follows:
 the process according to the third embodiment is applied to a Katakana character string where n=2 and N=3.
 the process according to the second embodiment is applied to a Kanji character string where N=2.
 the process according to the first embodiment is applied to another character type.

It is assumed that a registered document includes "ΩΣCSTMwΠr" ("検索システムを作る" in Japanese) where two Greek characters "ΩΣ" represent two Kanji characters "検索", four capital alphabets C, S, T and M represent four katakana characters "システム", one Greek character "Π" represents one kanji character "作" and small capital alphabets "w" and "r" represent characters "を" and "る" in another character type. The document "ΩΣCSTMwΠr" is divided into character strings "Ω" "ΩΣ" "Σ" "CS" "CST" "ST" "STM+ "TM" "M" "w" "Π" and "r" as index keys. The character string "M" is included in the above index keys since the character string "M" is less than n characters in length and the last character of the character string "CSTM".

One of the document retrieval processes are selectively determined based on whether or not a query character string is formed by only one character type only. When a query character string is formed by only one character type, the document retrieval process is conducted in accordance with the dividing method for dividing the character type. For example, when a query character string is a character string "ΩΣ" (two Kanji characters), the process described in the second embodiment is executed. As a result, a retrieval condition tree "ΩΣ" is obtained. On the other hand, when a query character string is formed by several character types, the above process is conducted for successive characters, which are formed by only one character type, of the query character string. As a result, a retrieval condition tree as a sub-retrieval condition tree is generated. It is assumed that a query character string is a character string "ΩΣCSTM" (two Kanji characters and four Katakana characters). In this case, a sub-retrieval condition tree "ΩΣ" is generated for two successive Kanji characters and a sub-retrieval condition tree "CSTM" is generated for four successive Katakana characters. Further, the above two sub-retrieval condition trees are jointed together in a distance (two characters) between the character string "ΩΣ" and the character string "CSTM". As a final result, a retrieval condition tree #distance[2]("ΩΣ", #distance[1]("CST", "STM")) is obtained.

The above query character string is, however, formed by several character types. When a partial character string of the query character string is formed by only one character type and the length of the partial character string is less than a minimum length n determined for the character type, the document retrieval process is not effectively conducted. For example, when a query character string is a character string "Mw" (one Katakana character and one Hiragana character), a sub-retrieval condition tree #or(M, MA, . . . ) for the character string "M" and a sub-retrieval condition tree "w" for the character string "w" are jointed together. As a final result, a retrieval condition tree #distance[1](#or(M, MA, . . . ), w) is obtained. However, in index keys developed by the OR set operator based on the sub-retrieval condition tree for the character string "M", index keys other than the character string "M" includes a character other than the character string "w" and can not have a distance with the character string "w". Accordingly, even if a partial character string of a query character string is formed by only one character type and the length of the partial character string is less than a minimum length n determined for the character type, the above problem can be eliminated by defining the partial character string itself as an index key. That is, in the above case of the query character string "Mw", a sub-retrieval condition tree "M" is determined for the character string "M". As a final result, a retrieval condition tree #distance [1](M, w) is obtained. Advantageously, the retrieval condition tree can be simplified and the speed of the document retrieval process can be improved.

Figure 12:
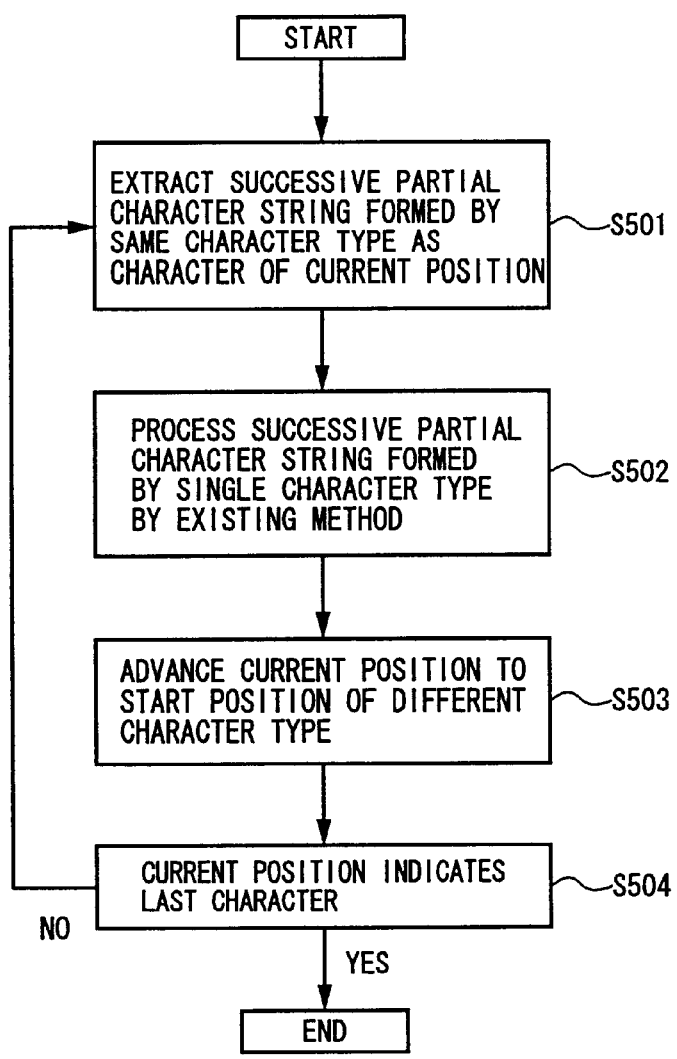
FIG. 12 is a flowchart showing a dividing process according to a fifth embodiment of the present invention.

FIG. 12 is a flowchart showing a dividing process according to the fifth embodiment of the present invention.

In a step S501 of FIG. 12, a successive partial character string formed by the same character type as character of a current position is extracted.

In a step S502, the successive partial character string formed by single character type is process by a predetermined method.

In a step S503, the current position is advanced to a start position of a different character type.

In a step S504, a check is made as to whether the current position indicates the last character. If the current position does not indicate the last character, the dividing process goes back to the step S501. If the current position indicates the last character, the dividing process is terminated.

In the above fifth embodiment, When a partial character string of a query character string is formed by only one character type and the length of the partial character string is less than a minimum length n determined for the character type, the document retrieval process is not effectively conducted. It should be noted that this problem is occurred only when index keys including the last character of a partial character string formed by only one character type are generated where N>1 in the first embodiment or in the third embodiment. That is, when a query character string is a character string "ΩC" (one Kanji character and one Katakana character), a sub-retrieval condition tree "Ω" for the character string "Ω" and a sub-retrieval condition tree #or(C, CA, . . . ) for the character string "C" are generated. As a final result, a retrieval condition tree #distance[1](Ω, #or(C, CA, . . . )) is obtained. However, when a location operator includes an OR set operator, the document retrieval process is complicated and the retrieval time is increased.

In a document retrieval apparatus 100 according to a sixth embodiment, for a character type which the dividing process in the first embodiment where n>1 or the third embodiment is applied to, the document dividing unit 1 divides a partial character string formed by the character type into index keys of n-character strings, index keys of n'-character strings including the last character of the partial character string where n' is an integer less than n characters, and index keys of n'-character strings including the beginning character of the partial character string. For example, when a registered document includes a character string "ΩΣCSTMwⅡr" ("検索システムを作る" in Japanese), the document "ΩΣCSTMwⅡr" is divided into character strings "Ω", "ΩΣ", "Σ", "C", "CS", "CST", "CS", "STM", "TM", "M", "w", "Ⅱ" and "r" as index keys. Differently from the fifth embodiment, a single character string "C", which is the beginning of a Katakana character string, is generated as an index key.

The document retrieval process is determined based on whether or not a query character string is formed by only one character type. A query character string formed by only one character type is simply processed in the same method as the fifth embodiment. On the other hand, in a case in which a query character string is formed by several character types, When a partial character string of the query character string is formed by only one character type and the length of the partial character string is less than a minimum length n determined for the character type, the document retrieval process is conducted in a different method from the fifth embodiment. In this case, when the registration is executed, n'-character strings including the beginning character of a partial string formed by only one character type are generated as index keys. Then, when documents are retrieved, the partial character string itself is used as an index key. That is, a query character string is a character string "ΣC", a sub-retrieval condition tree "C" is obtained for a character string "C". As a result, a retrieval condition tree #distance[1](Σ, C) is obtained.

Figure 13:
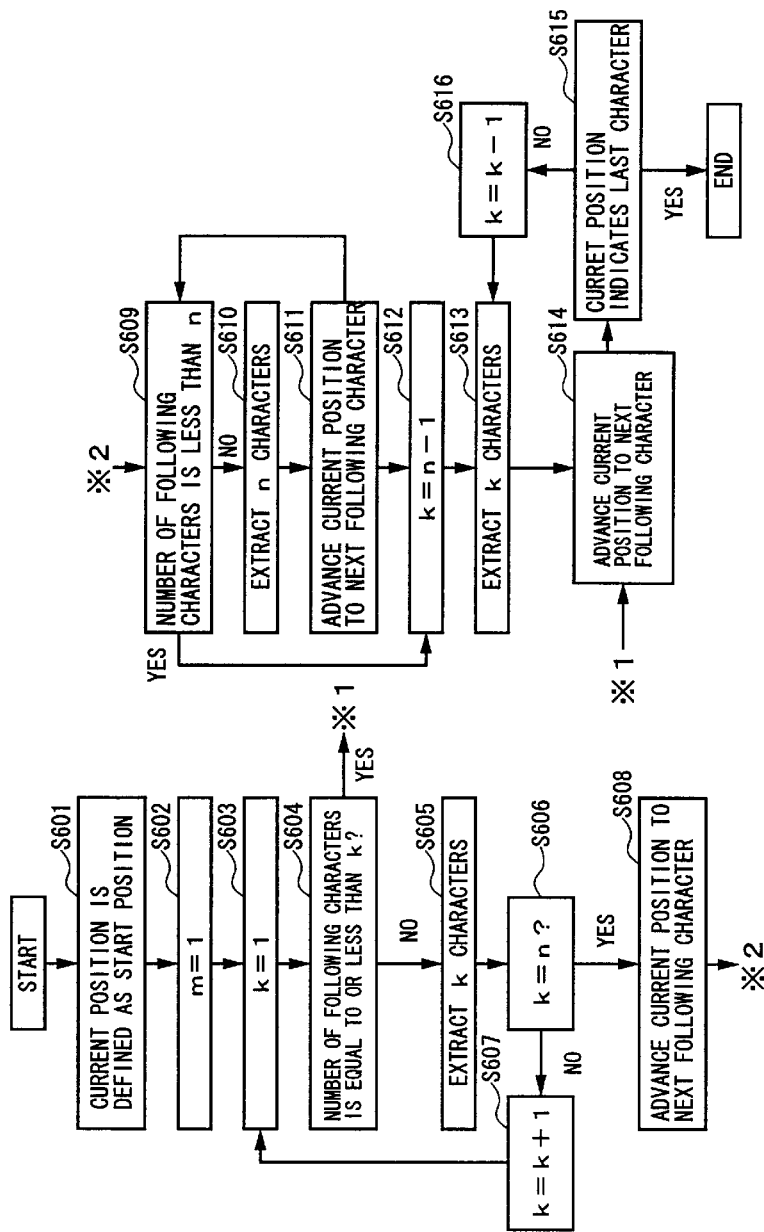
FIG. 13 is a flowchart showing a process executed by the document dividing unit according to a sixth embodiment of the present invention.

FIG. 13 is a flowchart showing a process executed by the document dividing unit according to the sixth embodiment of the present invention.

In a step S601, a current position is defined as a start position. Subsequently, m is set to 1 (m=1) in a step S602 and k is set to 1 (k=1) in a step S603.

In a step S604, a check is made as to whether the number of following character from the current position is equal to or less than k. If the number of following character from the current position is equal to or less than k, the process goes to a step S614. On the other hand, if the number of following character from the current position is not equal to or less than k, k characters are extracted in a step S605.

In a step S606, a check is made as to whether k is equal to n (k=n). If k is not equal to n, k is incremented by 1 (k=k+1) in a step S607 and then the process goes to the step S603. On the other hand, if k is equal to n, the current position is advanced to a next following character in a step S608.

In a step S609, a check is made as to whether the number of following characters is less than n. If the number of following characters is not less than n, n characters are extracted in a step S610 and then the current position is advanced to a next following character in a step S611. The process goes back to the step S609.

On the other hand, if the number of following characters is less than n, k is set to n−1 (k=n−1) in a step S612 and then k characters are extracted in a step S613.

In the step S614, the current position is advanced to a next following character.

In a step S615, a check is made as to whether the current position indicates the last character. If the current position does not indicate the last character, k is decreased by 1 (k=k−1) in a step S616. Thereafter, the process goes back to the step S613.

On the other hand, if the current position indicates the last character, the process is terminated.

In the document retrieval apparatus 100 according to the fifth embodiment, a two-character string formed by two character types is not stored as an index key and is not used for a search. However, a character string formed by several character types can be indicated as a query character string. It is assumed that a combination character string of Kanji and Hiragana characters such as a character string "Ψk" ("動き" in Japanese) is often used as a query character string. It should be noted that one Greek character "Ψ" represents one Kanji character "動" and one small capital alphabet "k" represents one Hiragana character "き". According to the fifth embodiment, the document retrieval process is conducted in accordance with a retrieval condition tree #distance[1](Ψ, k) for the above query character string "Ψk". Thus, the retrieval time is increased.

In a document retrieval apparatus 100 according to a seventh embodiment, a two-character string itself formed by several character strings is used as an index key when the two-character string is indicated. The document dividing unit 1 divides each partial character string formed by one character type into index keys based on n characters or N characters corresponding to the character type. In addition, the document dividing unit 1 generates the indicated two-character string formed by two character types as an index key. That is, in addition to indicate a process method for each character type, a combination character string such as a character string formed by Kanji and Hiragana character types is generated as an index key. When a registered document includes a character string "ΩΣCSTMwΠr" ("検索システムを作る" in Japanese), a character string "Ψk" ("作る" in Japanese) of a combination of Kanji and Hiragana characters is generated in addition to the character strings "Ω", "ΩΣ", "Σ", "CS", "CST", "ST", "STM", "TM", "M", "w", "Π", and "r" as index keys.

In the same method as the document dividing unit 1, the query character string dividing unit 3 divides the query character string into index keys. When the query character string does not include a two-character string formed by two character types, the retrieval condition analyzing unit 4 generates a retrieval condition tree in the same method as the fifth embodiment. When the query character string includes a two-character string formed by two character types, a partial character string formed by one character type is divided into index keys and extracts two-character strings formed by several character types are extracted as index keys. Then, the retrieval condition analyzing unit 4 generates a sub-retrieval condition tree by the location operator based on the above index keys.

When a combination character string, which is formed by Kanji and Katakana character types and a query character string, is a character string "ΩΣCSTM" ("検索システム" in Japanese), the entire query character string "ΩΣ CSTM" is used for generating sub-retrieval condition trees. Character strings "ΩΣ", "CSTM" and "STM" are extracted from successive Kanji characters "ΩΣ" and successive Katakana characters "CSTM". Further, a character string "ΣC", which is a combination character string formed by Kanji and Katakana character types, is extracted. Therefore, a retrieval condition tree #distance[1](ΩΣ, #distance[1](ΣC, #distance[1](CST, TEM))) is generated and is also a final retrieval condition tree.

Figure 14:
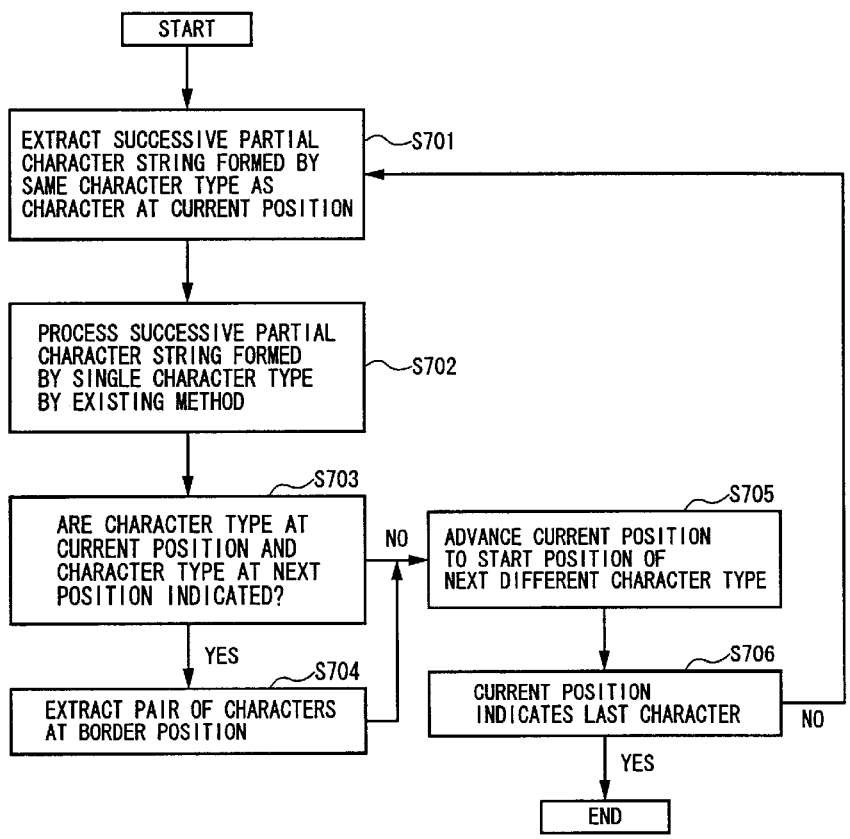
FIG. 14 is a flowchart showing a dividing process according to a seventh embodiment of the present invention.

FIG. 14 is a flowchart showing a dividing process according to the seventh embodiment of the present invention.

In a step S701 of FIG. 14, a successive partial character string is extracted where the successive partial character string is formed by the same character type as a character at a current position.

In a step S702, the successive partial character string formed by a single character type is processed by a method described above.

In a step S703, a check is made as to whether the character type at the current position and the character type at a next position are indicated. If the character type at the current position and the character type at a next position are indicated, a pair of characters is extracted at a border position in a step S704 and then the process goes to a step S705. On the other hand, if the character type at the current position and the character type at a next position are not indicated, the current position is advanced to a next start position of a different character type in the step S705.

In a step S706, a check is made as to whether the current position indicates the last character. If the current position does not indicate the last character, the process goes to the step S701. On the other hand, if the current position indicates the last character, the process is terminated.

When a query character string is a character string "ΩΣCSTMΠΦ" ("検索システム作成" in Japanese), the character string "ΩΣCSTMΠΦ" is divided into two character strings "ΩΣCSTM" and "ΠΦ" to generate two sub-retrieval condition trees since a combination of Katakana and Kanji character types is indicated. A sub-retrieval condition tree #distance[1](ΩΣ, #distance[1](ΣC, #distance[1](CST, TEM))) is generated from the character string "ΩΣCSTM" and another sub-retrieval condition tree "ΠΦ" is generated from the character string "ΠΦ". Consequently, a final retrieval condition tree #distance[6](#distance[1](ΩΣ, #distance[1](ΣC, #distance[1](CST, TEM))), ΠΦ) is obtained.

In the seventh embodiment, in a case in which a query character string includes a two-character string formed by two predetermined character types, this may result in wasting retrieval time when the first character of the two-character string is only one character in length when n=2. It is assumed that Kanji and Hiragana character types are indicated and dividing methods therefor are defined as the methods in the first embodiment where n=2. In this case, when a query character string is a character string "Λkg" ("動きが" in Japanese), a sub-retrieval condition tree #or(Λ, Λa, . . . ) is generated from a Kanji character string "Λ" and a sub-retrieval condition tree "kg" is generated from a Hiragana character string "kg". Further, a sub-retrieval condition tree "Λk" is generated from a character string "Λk" formed by Kanji and Hiragana character types. As a result of jointing the above three sub-retrieval condition trees, a final retrieval condition tree #distance[1](#distance[0](#or(Λk, Λa, . . . ), Λk), kg) is obtained. However, since #distance [0](#or(Λ, Λa, . . . ), Λk) is equal to the sub-retrieval condition tree "Λk", the above process for generating a retrieval condition tree results in wasting time.

Therefore, in a document retrieval apparatus 100 according to an eighth embodiment, when a query character string includes a two-character string formed by two indicated character strings and a dividing method is applied where n=2, the query character string dividing unit 3 does not generate an index key for the first character of the two-character string since the first character type of the two-character string must be a single character. That is, character strings "Λk" and "kg" are extracted from a query character string "Λkg". As a result, a final retrieval condition tree #distance[1](Λk, kg) is obtained. Therefore, the document retrieval process can be simplified and conducted at high speed.

According to the document retrieval apparatus 100 in the seventh embodiment, in a case in which a query character string includes a two-character string formed by two character types which are indicated for a combination character string, this may result in wasting retrieval time when the last character of the two-character string is only one character in length when n=2. It is assumed that Kanji and Hiragana character types are indicated and dividing methods therefor are defined as the methods in the first embodiment where n=2. In this case, when a query character string is a character string "ΛΠg" ("動作が" in Japanese), a sub-retrieval condition tree "ΛΠ" is generated from a Kanji character string "ΛΠ" and a sub-retrieval condition tree #or(g, ga, . . . ) is generated from a Hiragana character string "g". Further, a sub-retrieval condition tree "Πg" is generated from a character string "Πg" formed by Kanji and Hiragana character types. As a result of jointing the above three sub-retrieval condition trees, a final retrieval condition tree #distance[1] (ΛΠ, #distance[1](Πg, #or(g, ga, . . . ))) is obtained. However, since #or(g, ga, . . . ) is equal to the sub-retrieval condition tree "Πg", the above process for generating a retrieval condition tree results in wasting time.

Therefore, in a document retrieval apparatus 100 according to a ninth embodiment, when a query character string includes a two-character string formed by two character types which are indicated for a combination character string, the query character string dividing unit 3 does not generate an index key for the first character of the two-character string since the last character, which is formed by the second character type, of the two-character string must be a single character. That is, character strings "ΛΠ" and "Πg" are extracted from a query character string "ΛΠg". As a result, a final retrieval condition tree #distance[1](ΛΠg, Πg) is obtained. Therefore, the document retrieval process can be simplified and conducted at high speed.

In the document retrieval apparatus 100 in the seventh embodiment, when a query character string is formed by only one character type and the length of the query character string is less than a minimum length n determined for the character type, the document retrieval may not be effectively processed. That is, when index keys including the last character of a partial character string formed by only one character type are generated in the first embodiment where n>1 or in the third embodiment, the above problem is occurred. It is assumed that a combination of Hiragana and Kanji character types is indicated and a division method for Hiragana and Kanji character types is defined as the method in the first embodiment where N=2. When a query character string is a single Hiragana character "a", a retrieval condition tree #or(a, aa, . . . , az, aΓ, . . . , is obtained.

However, when documents are registered and a character string following the single Hiragana character "a" is included in the documents and formed by another character type, a single Hiragana character "a" is extracted. Thus, documents including index keys formed by characters in an order of Hiragana and Kanji character types are registered in an index table relating to a character "a". Consequently, the query character string dividing unit 3 is not needed to generate index keys formed in the order of Hiragana and Kanji character types.

In a document retrieval apparatus 100 according to a tenth embodiment, when a query character string is formed by one character type and the length of the query character string is less than a minimum length n determined for the character type, the query character string dividing unit 3 outputs index keys only where a first part of each the index key identically corresponds to that of the query character string and the index keys are formed by the character string alone. For example, a retrieval condition tree #or(a, aa, . . . , az) is obtained for a single character "a". As a result, it is not required to conduct the document retrieval process based on the above retrieval condition tree #or(a, aa, . . . , az, aΓ, . . . ) including combination character strings formed by Hiragana and Kanji character types. Therefore, the speed of the document retrieval process can be improved.

Figure 15:
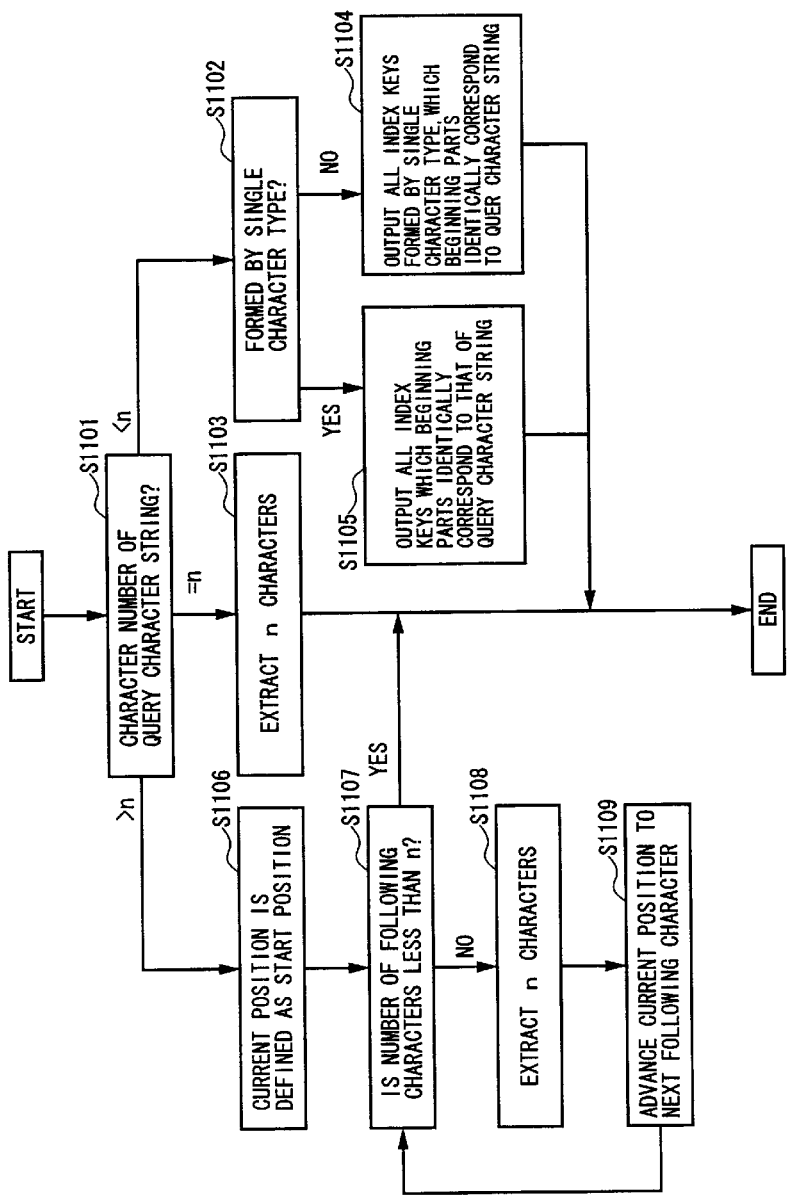
FIG. 15 is a flowchart showing a process executed by the query character string dividing unit according to a tenth embodiment of the present invention.

FIG. 15 is a flowchart showing a process executed by the query character string dividing unit according to a tenth embodiment of the present invention.

In a step S1101 of FIG. 15, the character number of a query character string is obtained. If the character number of the query character string is less than n, a check is made as to whether the query character string is formed by a single character type in a step S1102. If the query character string is not formed by a single character type, index keys are output where beginning parts of the index keys are identically correspond to the query character string and the index keys are formed by the same character string in a step S1104 and then the process is terminated. On the other hand, if the query character string is formed by a single character type, the index keys are output where the index keys have the same character as the query character string at the start position in a step S1105 and then the process is terminated.

If the character number of the query character string is equal to n, n characters are extracted in a step S1103 and then the process is terminated.

If the character number of the query character string is greater than n, the current position is defined as a start position in a step S1106.

In a step S1107, a check is made as to whether the number of following characters is less than n. If the number of following characters is less than n, the process is terminated.

On the other hand, if the number of following characters is not less than n, n characters are extracted in a step S1108. Subsequently, in a step S1109, the current position is advanced to a next following character and then the process goes back to the step S1107.

In the embodiments described above, when a query character string is divided into more than two index keys, the document retrieval process is conducted by using a retrieval condition synthesized by the location operators. In this method, a location matching process may be unnecessarily executed. It is assumed that a document 1 includes "aiuea", a document 2 includes "aiuei", a document 3 includes "aiueu", a document 4 includes "aiuee" and a document 5 includes "aiueo". In the method in the document retrieval apparatus 100 according to the first embodiment where n=2, the index table is generated as shown in FIG. 16.

When a query character string "aiiu" is processed in accordance with the method described in the first embodiment, character strings "ai", "ii" and "iu" are obtained as index keys and a retrieval condition tree #distance[2](#distance[1](ai, ii), iu) is generated. In this case, when the character strings "ai" and "iu" are located in distance of two characters, the character string "ii" is always positioned between the character strings "ai" and "iu". Thus, a retrieval condition tree #distance[2](ai, iu) is simply required. In a process for a retrieval condition including the location operator, a document ID including all index keys is specified and then a document identified by the document ID is properly retrieved based on the retrieval condition by checking whether or not the location operator properly indicates a distance between appearance locations of index keys in the document. In the case of the above query character string "aiiu", two index keys "ai" and "iu" are used. Further, the character string "ii" is used to effectively specify the document ID. In FIG. 16, the character string "ii" is not registered. Thus, by checking whether or not the character string "ii" appears in documents, it is easily found that there is no document including "aiiu" (the method described is disclosed in claims 8 and 9 in the prior Japanese Patent Laid-open Application No. 10-256974). Hereinafter, the process for specifying a document ID is called a candidate document determining process and the process for checking a distance between appearance locations is called a details checking process. A retrieval condition tree used for the candidate document determining process is called a candidate document retrieval condition tree and a retrieval condition tree use for the details determining process is called a check retrieval condition tree. In this case of the query character string "aiiu", the candidate document retrieval condition tree is determined as #and(ai, ii, iu) and the check retrieval condition tree is determined as #distance[2](ai, iu). It should be noted that #and operator executes an AND set operation for search results.

When the above method is applied to the auery character string "iueo", the candidate document retrieval condition tree is determined as #and(iu, ue, eo) and the check retrieval condition tree is determined as #distance[2](iu, eo). However, in this case, documents including a character string "iu" always includes a character string "ue". Thus, even if the character string "ue" is added to the candidate document retrieval condition tree, it can not effectively to select candidate documents. In addition, the process for the candidate document retrieval condition tree #and(iu, ue, eo) increases the retrieval time because of increase of an index key.

In a document retrieval apparatus 100 according to an eleventh embodiment, index keys, which can be used to effectively extract candidate documents, are added to a candidate document retrieval condition tree so that the speed of the document retrieval process is improved. That is, all index keys extracted from a query character string are not simply added. But, index keys used for a check retrieval condition tree are used for a candidate document retrieval condition tree. Further, index keys for a candidate document retrieval condition tree are extracted in a condition where the index keys are other than the above index keys used for a check retrieval condition tree and indicate less number of documents than other index keys listed neighbor in the check retrieval condition tree. For example, in a case of a query character string "aiiu", an index key "ii" shows the number "0" of documents while index keys "ai" and "iu" used for detail checking process show the number "5" of documents. Thus, the index key "ii" is used. On the other hand, in a case of a query character string "iueo", an index key "ue" shows the number "5" of documents while an index key "iu" used for detail checking process show the number "5" of documents. Since the number of documents for the index key "ue" is not less than that for the index key "iu", the index key "ue" is not used. In the eleventh embodiment, the index keys are determined where the index keys indicate less number of documents than other index keys listed neighbor in the check retrieval condition tree.

In a document retrieval apparatus 100 according to a twelfth embodiment, index keys, which can be used to effectively extract candidate documents, are added to a candidate document retrieval condition tree so that the speed of the document retrieval process is improved.

In the twelfth embodiment, differently from the eleventh embodiment, index keys are determined where the index keys indicate greater number of documents than other index keys listed neighbor in the check retrieval condition tree.

In claim 8 in the Japanese Patent Laid-open Application No. 10-020840 that is another prior application and is filed by the same applicant as the present invention, in a case in which a retrieval condition tree is formed by a nesting structure of a plurality of set operations, a leveling process is executed. That is, a latter child node is leveled in the same operation level as a former child node. For example, in a retrieval condition tree #or(#or(東京$_{TOKYO}$, 京都$_{KYOTO}$), 大阪$_{OOSAKA}$), a retrieval condition tree #or(東京$_{TOKYO}$, 京都$_{KYOTO}$, 大阪$_{OOSAKA}$) is obtained after the leveling process. It should be noted that #or denotes an OR set operator. Hereinafter, additional characters are provided for pronunciation of each Japanese character. Capital alphabet with an under bar shows pronunciation of a Kanji character.

However, when an OR set operator includes another OR set operator including a plurality of children nodes, the leveling process increases its cost.

In a document retrieval apparatus 100 according to a thirteenth embodiment, in a case in which a child node of an OR set operator obtaining an OR set of a plurality of retrieval results includes another OR set operator, when the number of children nodes in the another OR set operator as a child node of the OR set operator is less than a threshold, the retrieval condition analyzing part 4 defines a latter child node as a former child node and eliminates factors of the latter child node from the former child node.

In a case in which where are an OR set operator as a child node in an AND set operator for executing an AND operation of a plurality of retrieval results in a retrieval condition tree, the retrieval condition tree can be converted to another retrieval condition tree formed by an OR set operator including an AND set operator as a child node where the another retrieval condition tree can realize functional equivalent. That is, #and(#or(東京$_{TOKYO}$, 江戸$_{EDO}$), 大阪$_{OOSAKA}$) is converted to #or(#and(東京$_{TOKYO}$, 江戸$_{EDO}$), #and(江戸$_{EDO}$, 大阪$_{OOSAKA}$). By this conversion, it is possible to reduce the size of a document set to be searched for by an OR set operation. Therefore, the document retrieval process can be effectively conducted.

Figure 17:
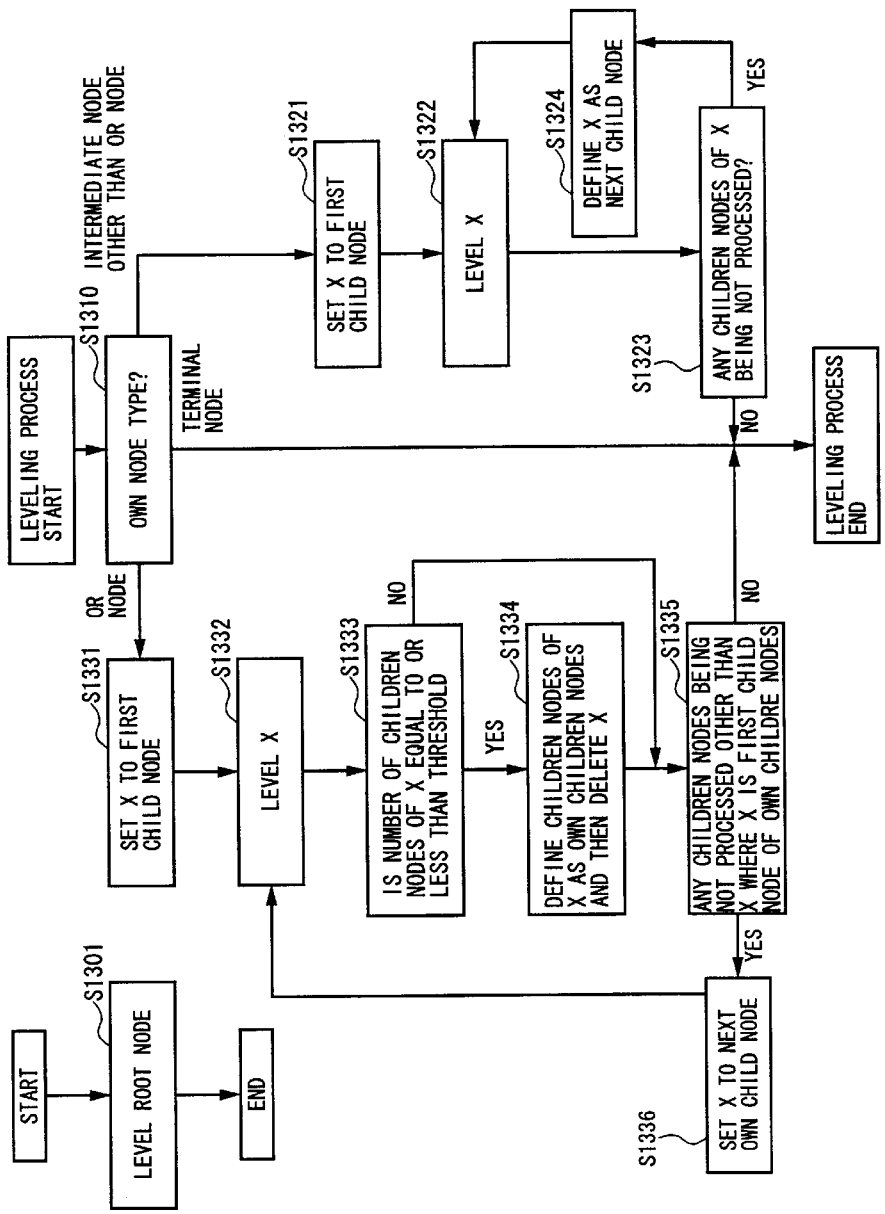
FIG. 17 is a flowchart showing a leveling process according to a thirteenth embodiment of the present invention.

FIG. 17 is a flowchart showing a leveling process according to a thirteenth embodiment of the present invention;

In a step S1301 of FIG. 17, a root node is leveled.

In a step S1310 of FIG. 17, an own node type is obtained. If the own node type is an intermediate node other than an OR set operator, X is set to a first child node in a step S1321. Subsequently, X is leveled in a step S1322.

In a step S1323, a check is made as to whether there are any children nodes of X being not processed yet. If there are any children nodes of X being not processed yet, X is defined as a next child node in a step S1324 and then the process goes back to the step S1322. On the other hand, if there are not any children nodes of X that are not processed, the process is terminated.

If the own node type is a terminal node, the process is terminated.

If the own node type is an OR node, X is set to a first child node in a step S1331 and then X is leveled in a step S1332.

In a step S1333, a check is made as to whether the number of children nodes of X is equal to or less than threshold. If the number of children nodes of X is greater than the threshold, the process goes to a step S1335.

On the other hand, if the number of children nodes of X is equal to or less than the threshold, children nodes of X are defined as own children nodes and then deleted in a step S1334. The process goes to a step S1335.

In the step S1335, a check is made as to whether there are any children nodes being not processed yet other than X where X is the first child node of own children nodes. If there are any children nodes being not processed yet other than X, X is set to next own child node in a step S1336. The process goes to the step S1332.

On the other hand, if there are not any children nodes being not processed yet other than X, the process is terminated.

However, when there are many children nodes in an OR set operator as a child node in an AND set operator, the above conversion results in increase of children nodes in the OR set operator. Hereinafter, capital alphabets with an under bar show pronunciation of a Kanji character, capital alphabets without an under bar show pronunciation of a Katakana character, and small capital alphabets show pronunciation of a Hiragana character. For example, in a case of #and(#or(東京$_{TOKYO}$, とうきょう$_{tokyo}$, トウキョウ$_{TOKYO}$, TOKYO, tokyo, 江戸$_{EDO}$, えど$_{edo}$, エド$_{EDO}$, EDO, edo), #or(大阪$_{OOSAKA}$, おおさか$_{oosaka}$, オオサカ$_{OOSAKA}$, OOSAKA, oosaka)), the conversion increases the number of children nodes up to 10×5=50. Thus, the cost of conversion is increased.

In a document retrieval apparatus 100 according to a fourteenth embodiment, in a case in which a child node of an AND set operator obtaining an AND set of a plurality of retrieval results includes an OR set operator in a retrieval condition and a number of children nodes in the OR set operator as a child node of the AND set operator is less than a threshold after the conversion, the retrieval condition tree can be converted to another retrieval condition tree formed by an AND set operator including an AND set operator as a child node where the another retrieval condition tree can realize functional equivalent. Therefore, it is possible to avoid increasing the cost of conversion in the case in which the number of children nodes in the OR set operator is increased by the conversion.

Figure 18:
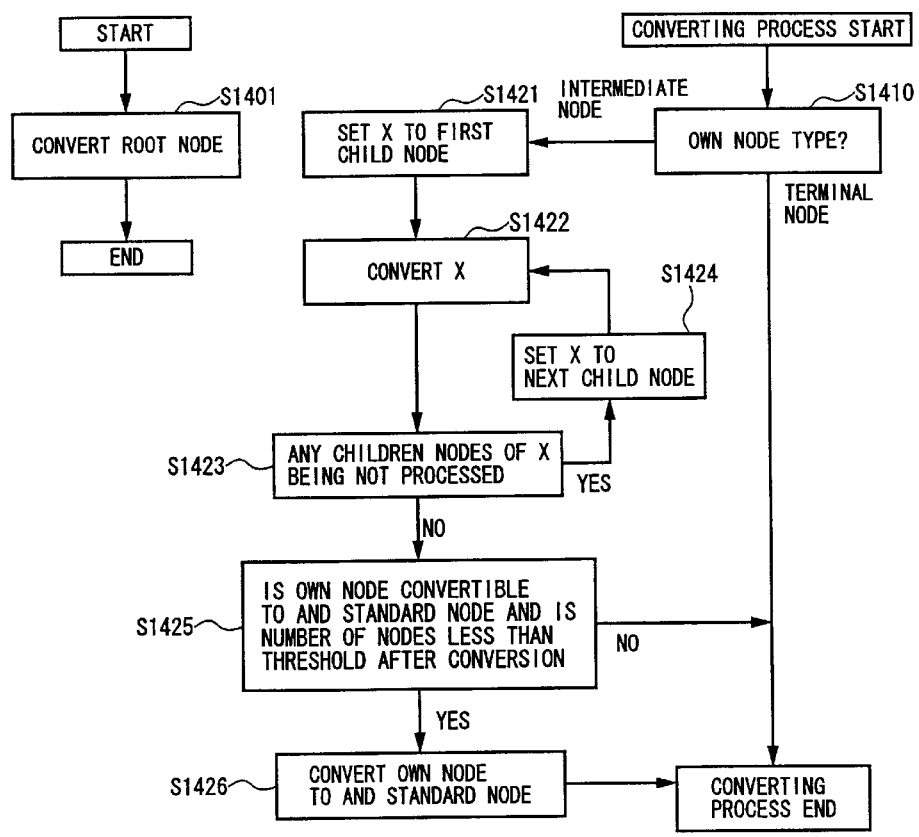
FIG. 18 is a flowchart showing a converting process according to a fourteenth embodiment of the present invention.

FIG. 18 is a flowchart showing a converting process according to a fourteenth embodiment of the present invention.

In a step S1401 of FIG. 18, a root node is converted.

In a step S1410, an own node type is obtained. If the own node type is a terminal node, the process is terminated.

On the other hand, if the own node type is the intermediate node, X is set to a first child node in a step S1421 and X is converted in a step S1422.

In a step S1423, a check is made as to whether there are any children nodes of X being not processed. If there are any children nodes of X being not processed, X is set to a next child node in a step S1424 and then the process goes back to the step S1422.

On the other hand, if there are any children nodes of X being not processed, a check is made as to whether the own node is convertible to an AND standard node and the number of nodes is less than threshold after conversion in a step S1425. If the check is positive, the own node is converted to the AND standard node and then the process is terminated.

On the other hand, if the check is negative, the process is terminated.

With regard to a case in which a query character string is divided into a plurality of index keys and the index keys are synthesized in a retrieval condition tree by an AND set operator, for example, the index keys are generated by the document retrieval apparatus 100 according to the first embodiment where n=2. Thereafter, from a retrieval condition #and(プ$_{PU}$リ$_{RI}$ン$_{N}$タ$_{TA}$, シ$_{SHI}$ス$_{SU}$テ$_{TE}$ム$_{MU}$), a retrieval condition tree #and(#distance[2](#distance[1](プ$_{PU}$リ$_{RI}$, リ$_{RI}$ン$_{N}$), ン$_{N}$タ$_{TA}$), #distance[2](#distance[1](シ$_{SHI}$ス$_{SU}$, ス$_{SU}$テ$_{TE}$), テ$_{TE}$ム$_{MU}$)) is generated. In the retrieval condition tree, documents including a character string "プ$_{PU}$リ$_{RI}$ン$_{N}$タ$_{TA}$" are retrieved by #distance[2](#distance[1](プ$_{PU}$リ$_{RI}$, リ$_{RI}$ン$_{N}$), ン$_{N}$タ$_{TA}$). Further, documents including a character string "シ$_{SHI}$ス$_{SU}$テ$_{TE}$ム$_{MU}$" are retrieved from the above determined documents by #distance[2](#distance[1](シ$_{SHI}$ス$_{SU}$テ$_{TE}$), テ$_{TE}$ム$_{MU}$). The documents retrieved above are evaluated as a retrieval result.

The above retrieval condition tree ends up to be #and(#distance[2](プ$_{PU}$リ$_{RI}$, ン$_{N}$タ$_{TA}$), #distance[2]シ$_{SHI}$ス$_{SU}$, テ$_{TE}$ム$_{MU}$). According to the Japanese Patent Laid-open Application No. 10-256974, in the document retrieval apparatus 100 as claimed in any one of claims 8, 9, 11 and 12, #and(プ$_{PU}$リ$_{RI}$, リ$_{RI}$ン$_{N}$, ン$_{N}$タ$_{TA}$) for #distance[2] (プ$_{PU}$リ$_{RI}$, ン$_{N}$タ$_{TA}$) and #and (シ$_{SHI}$ス$_{SU}$, ス$_{SU}$テ$_{TE}$, テ$_{TE}$ム$_{MU}$) for #distance[2] (シ$_{SHI}$ス$_{SU}$, テ$_{TE}$ム$_{MU}$) are determined as candidate document retrieval condition trees. Further, in this embodiment, by operating #and(プ$_{PU}$リ$_{RI}$, リ$_{RI}$ン$_{N}$, ン$_{N}$タ$_{TA}$), a candidate document including a character string "プ$_{PU}$リ$_{RI}$ン$_{N}$タ$_{TA}$" is determined. Further, it is checked by #and (シ$_{SHI}$ス$_{SU}$, ス$_{SU}$テ$_{TE}$, テ$_{TE}$ム$_{MU}$) whether or not the candidate document includes a character string "シ$_{SHI}$ス$_{SU}$テ$_{TE}$ム$_{MU}$)". Furthermore, it is checked whether or not the candidate document including the character strings "プ$_{PU}$リ$_{RI}$ン$_{N}$タ$_{TA}$" and "シ$_{SHI}$ス$_{SU}$テ$_{TE}$ム$_{MU}$)" satisfies a distance condition of #distance[2](プ$_{PU}$リ$_{RI}$, ン$_{N}$タ$_{TA}$) for specifying an order of the character string (プ$_{PU}$リ$_{RI}$ン$_{N}$タ$_{TA}$). When the candidate document is satisfied the location condition, it is checked whether or not the candidate document satisfies another distance condition of #distance[2](シ$_{SHI}$ス$_{SU}$, テ$_{TE}$ム$_{MU}$). Then, when a plurality of candidate documents satisfy all conditions above, a set of the plurality of candidate documents is determined as a final retrieval result. Therefore, it is possible to reduce the number of checking processes for location conditions. The document retrieval process can be conducted at high speed.

In a document retrieval apparatus 100 according to a fifteenth embodiment, a candidate document retrieval condition tree is synthesizing other candidate document retrieval condition trees as child nodes by an AND set operator. For example, a candidate document retrieval condition tree is determined as #and (プ$_{PU}$リ$_{RI}$, リ$_{RI}$ン$_{N}$, ン$_{N}$タ$_{TA}$, シ$_{SHI}$ス$_{SU}$, ス$_{SU}$テ$_{TE}$, テ$_{TE}$ム$_{MU}$) for the above retrieval condition #and(プ$_{PU}$リ$_{RI}$ン$_{N}$タ$_{TA}$, シ$_{SHI}$ス$_{SU}$テ$_{TE}$ム$_{MU}$). In this improved method, it is possible to reduce the retrieval time caused by the candidate document determination. Therefore, the document retrieval process can be conducted at higher speed.

Figure 19:
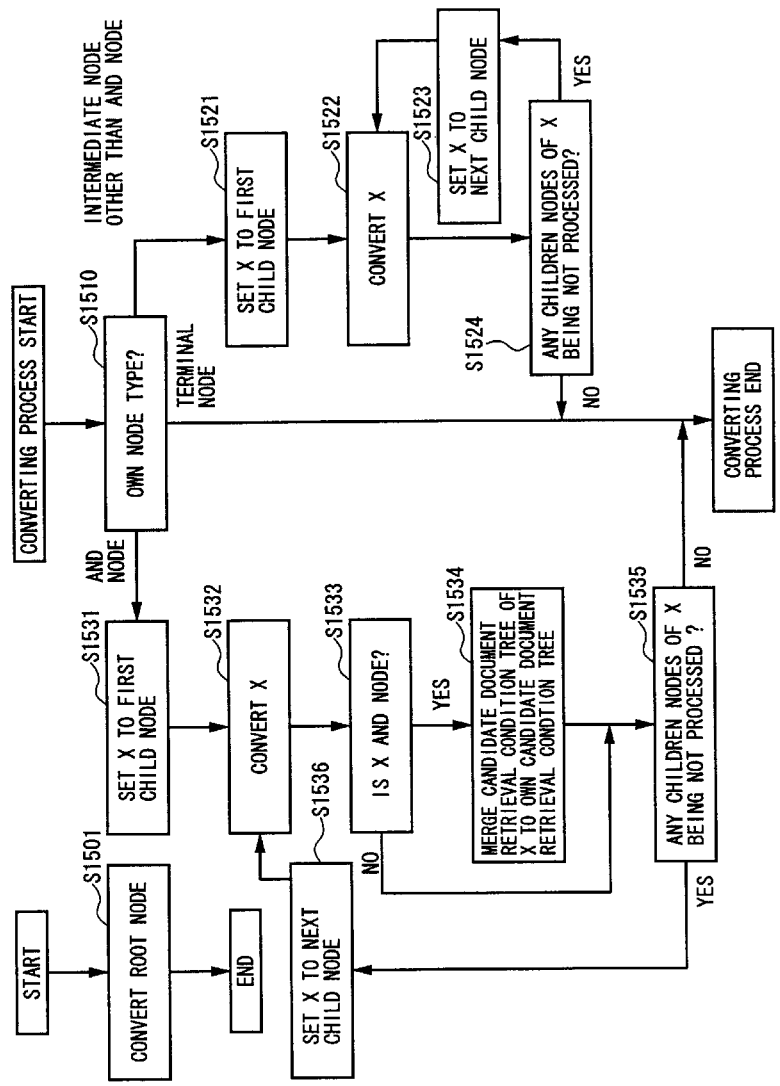
FIG. 19 is a flowchart showing a converting process according to a fifteenth embodiment of the present invention.

FIG. 19 is a flowchart showing a converting process according to a fifteenth embodiment of the present invention.

In a step S1502 of FIG. 19, a root node is converted.

In a step S1510, an own node type is obtained.

If the own node type is an intermediate node other than an AND node, X is set to a first child node in a step S1521 and then X is converted in a step S1522.

Subsequently, a check is made as to whether there are any children nodes of X being not processed in a step S1524. If there are any children nodes of X being not processed, X is set to a next child node in a step S1523 and then the process goes back to the step S1522. On the other hand, the process is terminated.

If the own node type obtained in the step S1510 is a terminal node, the process is terminated.

If the own node type obtained in the step S1510 is an AND node, X is set to a first child node in a step S1531 and X is converted in a step S1532.

In a step S1533, a check is made as to whether X is an AND node. If X is not an AND node, the process goes to a step S1535. On the other hand, if X is an AND node, a candidate document retrieval condition tree of X is merged to own candidate document retrieval condition tree in a step S1534 and then the process goes to the step S1535.

In the step S1535, a check is made as to whether there are any children nodes of X being not processed. If there are any children nodes of X being not processed, X is set to a next node in a step S1536 and then the process goes back to the step S1532. On the other hand, if there are not any children nodes of X being not processed, the process is terminated.

In the document retrieval apparatus 100 in the fifteenth embodiment, for a retrieval condition including an index node as a child node such as a retrieval condition #and ($プ_{PU}リ_{RI}ン_{N}タ_{TA}$, 装置$_{SOUCHI}$), a candidate document retrieval condition tree #and($プ_{PU}リ_{RI}$, $リ_{RI}ン_{N}$, $ン_{N}タ_{TA}$) is determined so as not to include the index node in the document retrieval condition. Therefore, candidate documents are not properly retrieved. The document retrieval process may end up consuming the retrieval time.

In a document retrieval apparatus 100 according to a sixteenth embodiment, an index node is additionally provided as a child node in an AND set operation formed by a candidate document retrieval condition tree of. For example, the candidate document retrieval condition tree is determined as #and($プ_{PU}リ_{RI}$, $リ_{RI}ン_{N}$, $ン_{N}タ_{TA}$), 装置$_{SOUCHI}$) for the document retrieval condition #and($プ_{PU}リ_{RI}ン_{N}タ_{TA}$, 装置$_{SOUCHI}$). In the sixteenth embodiment, candidate documents are properly extracted. Therefore, the speed of the document retrieval process can be improved.

Figure 20:
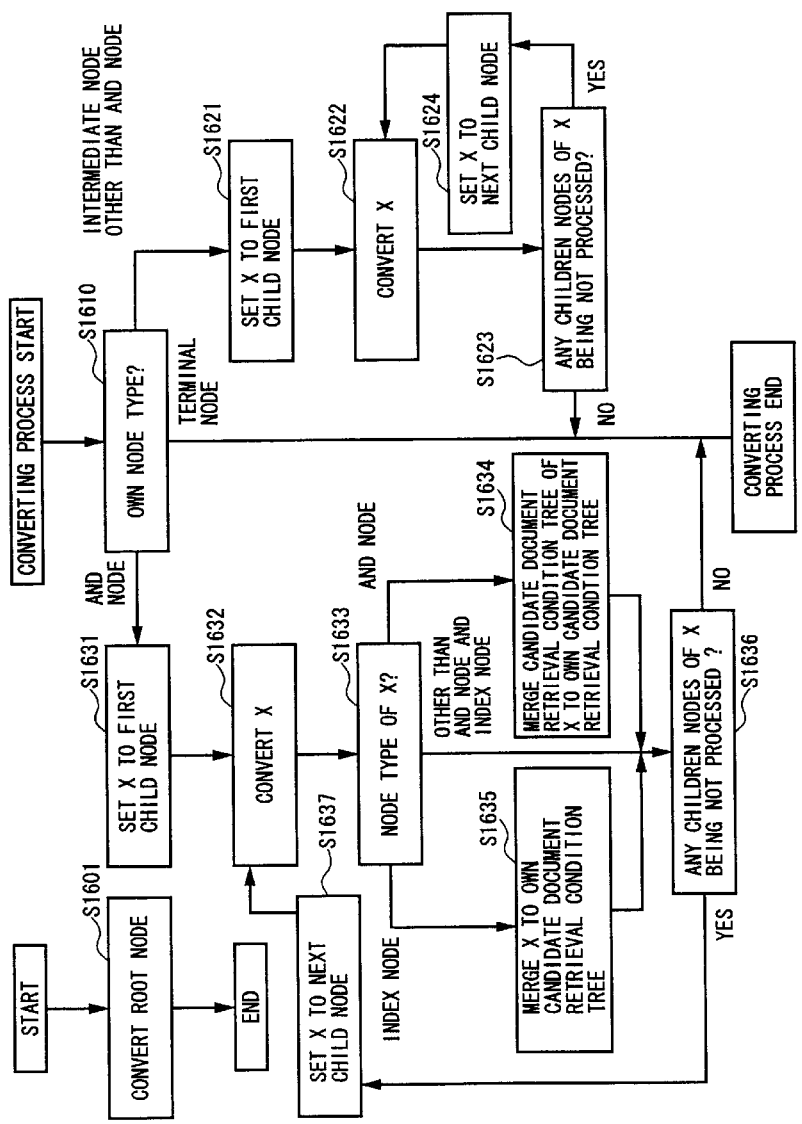
FIG. 20 is a flowchart showing a converting process according to a sixteenth embodiment of the present invention.

FIG. 20 is a flowchart showing a converting process according to a sixteenth embodiment of the present invention.

In a step S1601 of FIG. 20, a root node is converted.

In a step S1610, an own node type is obtained. If the own node type is an intermediate node other than an AND node, X is set to a first child node in a step S1621 and then X is converted in a step S1622.

In a step S1623, a check is made as to whether there are any children nodes of X being not processed. If there are any children nodes of X being not processed, X is set to a next child node in a step S1624 and then the process goes back to the step S1622. On the other hand, the process is terminated.

If the own node type obtained in the step S1610 is a terminal node, the process is terminated.

If the own node type obtained in the step S1610 is a terminal node, X is set to a first child node in a step S1631 and X is converted in a step S1632.

In a step S1633, a node type of X is obtained. If the node type of X is an AND node, a candidate document retrieval condition tree of X is merged to own candidate document retrieval condition tree in a step S1634 and then the process goes to a step S1636. If the node type of X is a node other than an AND node and an index node, the process goes to the step S1636. If the node type of X is an index node, X is merged to own candidate document retrieval condition tree and the process goes to the step S1636.

In the step S1636, a check is made as to whether there are any children nodes of X being not processed. If there are not any children nodes of X being not processed, the process is terminated. On the other hand, if there are any children nodes of X being not processed, X is set to a next child node in a step S1637 and then the process goes back to the step S1632.

In a document retrieval apparatus 100 according to a seventeenth embodiment, a retrieval condition synthesized by a set difference operator (hereinafter, described #and-not) obtaining a set difference between two retrieval result is considered. For example, when index keys are generated by the document retrieval process according to the first embodiment where n=2, a retrieval condition tree is determined as a "and-not(#distance[2](#distance[1](($プ_{PU}リ_{RI}$, $リ_{RI}ン_{N}$), $ン_{N}タ_{TA}$), #distance[2](#distance[1](($シ_{SHI}ス_{SU}$, $ス_{SU}テ_{TE}$), $テ_{TE}ム_{MU}$)) from a retrieval condition #and-not ($プ_{PU}リ_{RI}ン_{N}タ_{TA}$, $シ_{SHI}ス_{SU}テ_{TE}ム_{MU}$). Based on above retrieval condition, a document for a character string "$プ_{PU}リ_{RI}ン_{N}タ_{TA}$" is determined by operating #distance[2](#distance[1](($プ_{PU}リ_{RI}$, $リ_{RI}ン_{N}$), $ン_{N}タ_{TA}$). Further, it is determined whether or not the determined document for a character string "$プ_{PU}リ_{RI}ン_{N}タ_{TA}$" satisfies a distance condition of #distance[2](#distance[1] (($シ_{SHI}ス_{SU}$, $ス_{SU}テ_{TE}$), $テ_{TE}ム_{MU}$) for a character string $シ_{SHI}ス_{SU}テ_{TE}ム_{MU}$. When the determined document for the character string "$プ_{PU}リ_{RI}ン_{N}タ_{TA}$" does not satisfy the distance condition for a character string $シ_{SHI}ス_{SU}テ_{TE}ム_{MU}$, The determined document is added to a retrieval result.

In this case, a retrieval condition tree is determined as #and-not(#distance[2]($プ_{PU}リ_{RI}$, $ン_{N}タ_{TA}$), #distance[2] ($シ_{SHI}ス_{SU}$, $テ_{TE}ム_{MU}$)), According to the Japanese Patent Laid-open Application No. 10-256974, in the document retrieval apparatus 100 as claimed in any of claims 8, 9, 11 and 12, #and($プ_{PU}リ_{RI}$, $リ_{RI}ン_{N}$, $ン_{N}タ_{TA}$) for #distance[2] ($プ_{PU}リ_{RI}$, $ン_{N}タ_{TA}$) and #and($シ_{SHI}ス_{SU}$, $ス_{SU}テ_{TE}$, $テ_{TE}ム_{MU}$) for #distance[2]($シ_{SHI}ス_{SU}$, $テ_{TE}ム_{MU}$) are determined as candidate document retrieval condition trees. Further, in this embodiment, the retrieval condition tree #OR(#distance[2]($プ_{PU}リ_{RI}$, $ン_{N}タ_{TA}$), #distance[2] ($シ_{SHI}ス_{SU}$, $テ_{TE}ム_{MU}$)) is evaluated. In this embodiment, by operating #and($プ_{PU}リ_{RI}$, $リ_{RI}ン_{N}$, $ン_{N}タ_{TA}$) and #distance[2]($プ_{PU}リ_{RI}$, $ン_{N}タ_{TA}$), a document including a character string "$プ_{PU}リ_{RI}ン_{N}タ_{TA}$" is determined. It is determined by #and($シ_{SHI}ス_{SU}$, $ス_{SU}テ_{TE}$, $テ_{TE}ム_{MU}$) whether or not the determined document includes a character string "$シ_{SHI}ス_{SU}テ_{TE}ム_{MU}$". When the document including the character strings "$プ_{PU}リ_{RI}ン_{N}タ_{TA}$" and "$シ_{SHI}ス_{SU}テ_{TE}ム_{MU}$" satisfies a distance condition of #distance[2]($シ_{SHI}ス_{SU}テ_{TE}ム_{MU}$) for specifying an order of the character string "$シ_{SHI}ス_{SU}テ_{TE}ム_{MU}$". Therefore, documents are properly retrieved. It is possible to reduce the number of checking processes for location conditions. The document retrieval process can be conducted at high speed.

In a document retrieval apparatus 100 according to a eighteenth embodiment, the document retrieval process can be improved in a case of using a retrieval condition formed by synthesizing a plurality of index keys divided from a query character string by an OR set operator. For example, when index keys are generated by the method according to the first embodiment where n=2, a retrieval condition tree is determined as #OR(#distance[2]($ア_{PU}リ_{RI}$, $ン_N タ_{TA}$), #distance[2]($シ_{SHI}ス_{SU}$, $テ_{TE}ム_{MU}$)) from #or ($ア_{PU}リ_{RI}ン_N タ_{TA}$, $シ_{SHI}ス_{SU}テ_{TE}ム_{MU}$).

According to the Japanese Patent Laid-open Application No. 10-256974, in the document retrieval apparatus 100 as claimed in any one of claims 8, 9, 11 and 12, #and($ア_{PU}リ_{RI}$, $リ_{RI}ン_N$, $ン_N タ_{TA}$) for #distance[2]($ア_{PU}リ_{RI}$, $ン_N タ_{TA}$) and #and($シ_{SHI}ス_{SU}$, $ス_{SU}テ_{TE}$, $テ_{TE}ム_{MU}$) for #distance[2] ($シ_{SHI}ス_{SU}$, $テ_{TE}ム_{MU}$) are determined as candidate document retrieval condition trees. In this embodiment, the retrieval condition tree #OR(#distance[2]($ア_{PU}リ_{RI}$, $ン_N タ_{TA}$), #distance[2]($シ_{SHI}ス_{SU}$, $テ_{TE}ム_{MU}$)) is evaluated. In this embodiment, first, by operating #and ($ア_{PU}リ_{RI}$, $リ_{RI}ン_N$, $ン_N タ_{TA}$) and #distance[2]($ア_{PU}リ_{RI}$, $ン_N タ_{TA}$), a document including a character string "$ア_{PU}リ_{RI}ン_N タ_{TA}$" is determined and included in a retrieval result for "$ア_{PU}リ_{RI}ン_N タ_{TA}$". Second, by operating #and ($シ_{SHI}ス_{SU}$, $ス_{SU}テ_{TE}$, $テ_{TE}ム_{MU}$) and #distance[2] ($シ_{SHI}ス_{SU}$, $テ_{TE}ム_{MU}$), a document including a character string "$シ_{SHI}ス_{SU}テ_{TE}ム_{MU}$" is determined and included in a retrieval result for "$シ_{SHI}ス_{SU}テ_{TE}ム_{MU}$". And then, an AND set operation is conducted for both the retrieval result for "$ア_{PU}リ_{RI}ン_N タ_{TA}$" and the retrieval result for "$シ_{SHI}ス_{SU}テ_{TE}ム_{MU}$".

However, when a document including the character string "$シ_{SHI}ス_{SU}テ_{TE}ム_{MU}$" is determined, the retrieval result for "$ア_{PU}リ_{RI}ン_N タ_{TA}$" is completed. Thus, it is not needed to check whether or not the document including the character string "$シ_{SHI}ス_{SU}テ_{TE}ム_{MU}$" is determined. Instead of the above second process, when it determined by operating #and($シ_{SHI}ス_{SU}$, $ス_{SU}テ_{TE}$, $テ_{TE}ム_{MU}$) that a candidate document includes the character string "$シ_{SHI}ス_{SU}テ_{TE}ム_{MU}$" and also it is determined the candidate document does not include the character string "$ア_{PU}リ_{RI}ン_N タ_{TA}$", it is determined by operating #distance[2]($シ_{SHI}ス_{SU}$, $テ_{TE}ム_{MU}$) whether or not the candidate document satisfies a distance condition for "$シ_{SHI}ス_{SU}テ_{TE}ム_{MU}$". When it is determined that the candidate document satisfies the distance condition for "$シ_{SHI}ス_{SU}テ_{TE}ム_{MU}$", the candidate document is added to the retrieval result sets. On the other hand, when the candidate document includes the character string "$ア_{PU}リ_{RI}ン_N タ_{TA}$", it is not needed to check the distance condition and the next candidate document is determined. Therefore, in the document retrieval apparatus 100 in the eighteenth embodiment, it is possible to reduce the number of checks of distance conditions for a child node. The speed of the document retrieval process can be improved.

The present invention is not limited to the specifically disclosed embodiments, and variations and modifications may be made without departing from the scope of the present invention.

The present application is based on the Japanese priority applications No. 11-230749 filed on Aug. 17, 1999, entire contents of which are hereby incorporated by reference.

What is claimed is:

1. An apparatus for retrieving documents comprising:
 a document dividing part dividing each document into partial character strings as index keys;
 an index table maintaining the index keys and document information relating to each index key;
 a query character string dividing part dividing a query character string into a plurality of index keys;
 a retrieval condition analyzing part analyzing a retrieval condition including the index keys divided from the query character string and generating a retrieval condition tree where the index keys are synthesized by at least one operator that retrieves an intermediate retrieval result including the document information from said index table; and
 a retrieval condition evaluating part evaluating each intermediate retrieval result obtained by the retrieval condition tree and determining a final retrieval result,
 wherein said document dividing part divides the document into index keys of n-character strings having n characters and m-character strings having m characters where n is an integer greater than one and m is an integer less than n, and each of m-character strings includes a last character of the document,
 wherein, when at least two index keys are divided from the query character string by said query character string dividing part, said retrieval condition analyzing part includes:
  a first condition tree generating part generating a first condition tree synthesized by at least one AND set operator obtaining an AND set of a plurality of the intermediate retrieval results based on said at least two index keys; and
 a second condition tree generating part selecting a minimum number of index keys, which cover a full length of the query character string, from said at least two index keys and generating a second condition tree synthesized by at least one distance operator indicating a distance between appearance positions of said at least two index keys,
 wherein:
  said retrieval condition analyzing part includes a document determining part obtaining candidate documents by executing the first condition tree and determining documents from the candidate documents by calculating a second condition tree; and
 said first condition tree generating part generates the first condition tree by index keys used in the second condition tree and other index keys positioned in the query character string before or after the index keys used in the second condition tree and indicating a least number of the documents including the other index keys.

2. The apparatus as claimed in claim 1, wherein:
 said query character string dividing part divides a query character string into more than two index keys of n-character strings having n characters so as to overlap query character when a length of the query character string is more than n+1 characters where n is an integer greater than one; and
 said retrieval condition analyzing part synthesizes the index keys by at least one distance operator indicating a distance between the index keys divided by said query character string dividing part.

3. The apparatus as claimed in claim 1, wherein:

said query character string dividing part defines a query character string as an index key when the query character string is n characters in length where n is an integer greater than one; and said retrieval condition analyzing part generates a final retrieval condition formed by the index key.

4. The apparatus as claimed in claim 1, wherein:

said query character string dividing part outputs index keys from said index table where a first part of each index key identically corresponds to that of the query character string when a length of the query character string is less than n characters where n is an integer greater than one; and said retrieval condition analyzing part generates the retrieval condition tree where the index keys, which are output by said query character string dividing part, are synthesized by at least one OR set operator obtaining an OR set of a plurality of the intermediate retrieval results.

5. The apparatus as claimed in claim 1, wherein said document dividing part divides the document into index keys of k-character strings having k characters where k, n and N are integers, n is equal to or greater than two, k is not less than one and is not more than N ($1 \leq k \leq N$), and the k-character string has k characters.

6. The apparatus as claimed in claim 1, wherein said document dividing part divides the document into index keys of k-character strings having k characters and m-character strings having m characters where k, m, n and N are integers, n and N are equal to or more than two and n is less than N (n<N), k is not less than n and is not more than N ($n \leq k \leq N$), m is less than n (m<n), and each of m-character strings includes a last character of the document.

7. The apparatus as claimed in claim 1, wherein said query character string dividing part outputs index keys from said index table where a beginning part of each index key identically corresponds to that of the query character string when a length of the query character string is less than n characters where n is an integer greater than one.

8. The apparatus as claimed in claim 1, wherein said document dividing part divides the document into successive partial character strings and said query character string dividing part divides the document into successive partial character strings, wherein each successive partial character string is formed by a single character type, and divides each successive partial character string into index keys by a method defined based on the single character type.

9. The apparatus as claimed in claim 8, wherein said document dividing part each successive partial character string formed by a single character type into index keys of n-character strings having n characters and m-character strings having m characters where n is an integer greater than one and m is an integer less than n, and each of m-character strings includes a first character or a last character of each successive partial character string.

10. The apparatus as claimed in claim 8, wherein said document dividing part further extracts two-character strings and said query character string dividing part extracts two-character strings wherein each of two-character strings is formed by two different character types included in the document and predetermined as a combination character string.

11. The apparatus as claimed in claim 10, wherein said query character string dividing part does not extract a first character of the two-character string when one of the two different character types forming the two-character string forms the first character only.

12. The apparatus as claimed in claim 10, wherein said query character string dividing part does not extract a last character of the two-character string when one of the two different character types forming the two-character string forms the last character only.

13. The apparatus as claimed in claim 8, wherein said query character string dividing part outputs index keys formed by a single character string where a beginning part of each index key identically corresponds to the query character string when the query character string is formed by the single character type and a length of the query character string is equal to or less than a minimum length n defined for extracting a partial character string formed by the single character type.

14. The apparatus as claimed in claim 1, wherein said retrieval condition analyzing part synthesizes said first condition tree as a child node by an AND set operator so as to generate a synthesized first condition tree, and said retrieval condition evaluating part obtains candidate documents based on the synthesized first condition tree and determines a final retrieval result.

15. The apparatus as claimed in claim 14, wherein said retrieval condition analyzing part additionally provides, in said first condition tree indicated by an AND set operator, an index key node as a child node of said AND set operator.

16. The apparatus as claimed in claim 1, wherein said retrieval condition evaluating part checks, in a set difference operator obtaining a set difference between two retrieval results, a first retrieved document obtained by a first node possible to be a candidate document for a second node and determines the first retrieved document not to be the candidate document in accordance with a result of checking.

17. The apparatus as claimed in claim 1, wherein when at least two index keys are divided from the query character string by said query character string dividing part, said retrieval condition analyzing part includes:

a first condition tree generating part generating a first condition tree synthesized by at least one AND set operator an AND set of a plurality of the intermediate retrieval results based on said at least two index keys; and a second condition tree generating part selecting index keys, which cover a full length of the query character string and indicate a least total number of the documents including the index keys, from said at least two index keys and generating a second condition tree synthesized by at least one distance operator indicating a distance between appearance positions of said at least two index keys, wherein:

said retrieval condition analyzing part includes a document determining part obtaining candidate documents by executing the first condition tree and determining documents from the candidate documents by calculating a second condition tree; and said first condition tree generating part generates the first condition tree by index keys used in the second condition tree and other index keys positioned in the query character string before or after the index keys used in the second condition tree and indicating a least number of the documents including the other index keys themselves.

18. The apparatus as claimed in claim 17, wherein said retrieval condition analyzing part synthesizes said first condition tree as a child node by an AND set operator so as to generate a synthesized first condition tree, and said retrieval condition evaluating part obtains candidate documents based on the synthesized first condition tree and determines a final retrieval result.

19. The apparatus as claimed in claim 17, wherein said retrieval condition evaluating part checks, in a set difference operator obtaining a set difference between two retrieval results, a first retrieved document obtained by a first node possible to be a candidate document for a second node and determines the first retrieved document not to be the candidate document in accordance with a result of checking.

20. The apparatus as claimed in claim 1, wherein when a child node of an OR set operator obtaining an OR set of a plurality of retrieval results includes another OR set operator in said retrieval condition and a number of children nodes in said another OR set operator as a child node of the OR set operator is less than a threshold, said retrieval condition analyzing part includes a leveling part defining a latter child node as a former child node and eliminating factors of the latter child node from the former child node.

21. The apparatus as claimed in claim 1, wherein when a child node of an AND set operator obtaining an AND set of a plurality of retrieval results includes an OR set operator in said retrieval condition and a number of children nodes in the OR set operator as a child node of the OR set operator is less than a threshold after said retrieval condition is converted to another functionally equal retrieval condition defined by an OR operator which a child node includes an AND operator, said retrieval condition analyzing part executes to convert said retrieval condition.

22. The apparatus as claimed in claim 1, wherein said retrieval condition evaluating part checks, in a set difference operator obtaining a set difference between two retrieval results, a first retrieved document obtained by a first node possible to be a candidate document for a second node and determines the first retrieved document not to be the candidate document in accordance with a result of checking.

23. The apparatus as claimed in claim 1, wherein said retrieval condition evaluating part obtains, in order to evaluate an AND set operator, candidate documents for each child node, checks whether or not the candidate documents are included in a result set obtained by the AND set operator, determines whether or not the candidate documents are documents corresponding to the child node based on the check result, and adds the documents corresponding to the child node to the AND set operator based on the determination result.

24. A method for retrieving documents comprising the steps of:

(a) dividing each document into partial character strings as index keys;

(b) maintaining the index keys and document information relating to each index key;

(c) dividing a query character string into a plurality of index keys;

(d) analyzing a retrieval condition including the index keys divided from the query character string and generating a retrieval condition tree where the index keys are synthesized by at least one operator that retrieves an intermediate retrieval result including the document information from said index table; and (e) evaluating each intermediate retrieval result obtained by the retrieval condition tree and determining a final retrieval result, wherein said step (a) divides the document into index keys of n-character strings having n characters and m-character strings having m characters where n is an integer greater than one and m is an integer less than n, and each of m-character strings includes a last character of the document, wherein when at least two index keys are divided from the query character string by said code (c), said code (d) includes the codes of:

(f) generating a first condition tree synthesized by at least one AND set operator obtaining an AND set of a plurality of the intermediate retrieval results based on said at least two index keys;

(g) selecting a minimum number of index keys, which cover a full length of the query character string, from said at least two index keys and generating a second condition tree synthesized by at least one distance operator indicating a distance between appearance positions of said at least two index keys, and wherein:

said code (d) includes a code of obtaining candidate documents by executing the first condition tree and determining documents from the candidate documents by calculating a second condition tree; and wherein said code (f) generates the first condition tree by index keys used in the second condition tree and other index keys positioned in the query character string before or after the index keys used in the second condition tree and indicating a least number of the documents including the other index keys.

25. The method as claimed in claim 24, wherein:

said step (c) divides a query character string into more than two index keys of n-character strings having n characters so as to overlap query character when a length of the query character string is more than n+1 characters where n is an integer greater than one, and said step (d) synthesizes the index keys by at least one distance operator indicating a distance between the index keys divided in said step (c).

26. The method as claimed in claim 24, wherein:

said step (c) defines a query character string as an index key when the query character string is n characters in length where n is an integer greater than one; and said step (d) generates a final retrieval condition formed by the index key.

27. The method as claimed in claim 24, wherein:

said step (c) outputs index keys from said index table where a first part of each index key identically corresponds to that of the query character string when a length of the query character string is less than n characters where n is an integer greater than one; and said step (d) generates the retrieval condition tree where the index keys, which are output in said step (c), are synthesized by at least one OR set operator obtaining an OR set of a plurality of the intermediate retrieval results.

28. The method as claimed in claim 23, wherein said step (d) synthesizes said first condition tree as a child node by an AND set operator so as to generate a synthesized first condition tree, and said step (e) obtains candidate documents based on the synthesized first condition tree and determines a final retrieval result.

29. The method as claimed in claim 28, wherein said step (d) additionally provides, in said first condition tree indicated by an AND set operator, an index key node as a child node of said AND set operator.

30. The method as claimed in claim 24, wherein said step (e) checks, in a set difference operator obtaining a set difference between two retrieval results, a first retrieved document obtained by a first node possible to be a candidate document for a second node and determines the first retrieved document not to be the candidate document in accordance with a result of checking.

31. The method as claimed in claim 24, wherein said step (e) obtains, in order to evaluate an AND set operator, candidate documents for each child node, checks whether or not the candidate documents are included in a result set obtained by the AND set operator, determines whether or not the candidate documents are documents corresponding to the child node based on the check result, and adds the documents corresponding to the child node to the AND set operator based on the determination result.

32. A computer-readable recording medium having program code recorded therein for causing a computer to retrieve documents, said program code comprising the codes for:

(a) dividing each document into partial character strings as index keys;

(b) maintaining the index keys and document information relating to each index key;

(c) dividing a query character string into a plurality of index keys;

(d) analyzing a retrieval condition including the index keys divided from the query character string and generating a retrieval condition tree where the index keys are synthesized by at least one operator that retrieves an intermediate retrieval result including the document information from said index table; and (e) evaluating each intermediate retrieval result obtained by the retrieval condition tree and determining a final retrieval result, wherein said code (a) divides the document into index keys of n-character strings having n characters and m-character strings having m characters where n is an integer greater than one and m is an integer less than n, and each of m-character strings includes a last character of the document, wherein when at least two index keys are divided from the query character string by said code (c), said code (d) includes the codes of:

(f) generating a first condition tree synthesized by at least one AND set operator obtaining an AND set of a plurality of the intermediate retrieval results based on said at least two index keys;

(g) selecting a minimum number of index keys, which cover a full length of the query character string, from said at least two index keys and generating a second condition tree synthesized by at least one distance operator indicating a distance between appearance positions of said at least two index keys, and wherein:

said code (d) includes a code of obtaining candidate documents by executing the first condition tree and determining documents from the candidate documents by calculating a second condition tree; and wherein said code (f) generates the first condition tree by index keys used in the second condition tree and other index keys positioned in the query character string before or after the index keys used in the second condition tree and indicating a least number of the documents including the other index keys.

33. The computer-readable recording medium as claimed in claim 32, wherein said code (c) divides a query character string into more than two index keys of n-character strings having n characters so as to overlap query character when a length of the query character string is more than n+1 characters where n is an integer greater than one, and said code (d) synthesizes the index keys by at least one distance operator indicating a distance between the index keys divided by said code (c).

34. The computer-readable recording medium as claimed in claim 32, wherein:

said code (c) defines a query character string as an index key when the query character string is n characters in length where n is an integer greater than one; and said code (d) generates a final retrieval condition formed by the index key.

35. The computer-readable recording medium as claimed in claim 32, wherein:

said code (c) outputs index keys from said index table where a first part of each index key identically corresponds to that of the query character string when a length of the query character string is less than n characters where n is an integer greater than one; and said code (d) generates the retrieval condition tree where the index keys, which are output by said code (c), are synthesized by at least one OR set operator obtaining an OR set of a plurality of the intermediate retrieval results.

36. The computer-readable recording medium as claimed in claim 33, wherein said code (d) synthesizes said first condition tree as a child node by an AND set operator so as to generate a synthesized first condition tree, and said code (e) obtains candidate documents based on the synthesized first condition tree and determines a final retrieval result.

37. The computer-readable recording medium as claimed in claim 36, wherein said code (d) additionally provides, in said first condition tree indicated by an AND set operator, an index key node as a child node of said AND set operator.

38. The computer-readable recording medium as claimed in claim 32, wherein said code (e) checks, in a set difference operator obtaining a set difference between two retrieval results, a first retrieved document obtained by a first node possible to be a candidate document for a second node and determines the first retrieved document not to be the candidate document in accordance with a result of checking.

39. The computer-readable recording medium as claimed in claim 32, wherein said code (e) obtains, in order to evaluate an AND set operator, candidate documents for each child node, checks whether or not the candidate documents are included in a result set obtained by the AND set operator, determines whether or not the candidate documents are documents corresponding to the child node based on the check result, and adds the documents corresponding to the child node to the AND set operator based on the determination result.

* * * * *